(12) United States Patent
Manolakos et al.

(10) Patent No.: US 11,444,734 B2
(45) Date of Patent: Sep. 13, 2022

(54) BEAM-SPECIFIC GROUP DELAY / FREQUENCY LOOKUP TABLE SIGNALING FOR HIGH-PRECISION MULTI-ROUND-TRIP-TIME

(71) Applicant: QUALCOMM Incorporated, San Diego, CA (US)

(72) Inventors: Alexandros Manolakos, San Diego, CA (US); Alexander Dorosenco, El Cajon, CA (US); Jay King, San Diego, CA (US); Joseph Binamira Soriaga, San Diego, CA (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 16/795,338

(22) Filed: Feb. 19, 2020

(65) Prior Publication Data

US 2021/0075573 A1    Mar. 11, 2021

(30) Foreign Application Priority Data

Sep. 10, 2019   (GR) ............................. 20190100390

(51) Int. Cl.
*H04L 5/00*      (2006.01)
*H04W 72/04*    (2009.01)

(52) U.S. Cl.
CPC ......... *H04L 5/0051* (2013.01); *H04W 72/044* (2013.01); *H04W 72/048* (2013.01); *H04W 72/0413* (2013.01)

(58) Field of Classification Search
None
See application file for complete search history.

(56) References Cited

U.S. PATENT DOCUMENTS 11,206,549 B1 * 12/2021 Eyuboglu ............ H04J 11/0073
2011/0170463 A1    7/2011 Aryan et al.
(Continued)

OTHER PUBLICATIONS

International Search Report and Written Opinion—PCT/US2020/046769—ISAEPO—dated Oct. 16, 2020.
(Continued)

*Primary Examiner* — Phirin Sam
(74) *Attorney, Agent, or Firm* — Qualcomm Incorporated

(57) ABSTRACT

Disclosed are techniques for reporting a group delay-per-frequency lookup table for transmit and receive beams. In an aspect, a user equipment (UE) receives, from a transmission-reception point (TRP), a first downlink reference signal on at least one downlink reference signal resource using a downlink receive beam, transmits, to the TRP, an uplink reference signal on at least one uplink reference signal resource using an uplink transmit beam, determines a parameter representing a difference between a reception time of the first downlink reference signal and a transmission time of the uplink reference signal, transmit the parameter to a network entity, and transmits, to the network entity, a first lookup table or an identifier of the first lookup table, wherein the first lookup table represents per-frequency group delay information for the downlink receive beam and/or the uplink transmit beam.

76 Claims, 13 Drawing Sheets

(56) References Cited

U.S. PATENT DOCUMENTS

| | | | | |
|---|---|---|---|---|
| 2015/0009984 | A1* | 1/2015 | Jung | H04W 56/0055 370/350 |
| 2016/0205670 | A1* | 7/2016 | Kakishima | H04B 7/04 370/280 |
| 2019/0104549 | A1* | 4/2019 | Deng | H04W 52/365 |
| 2019/0132816 | A1* | 5/2019 | Xue | H04W 48/16 |
| 2019/0261367 | A1* | 8/2019 | Wu | H04L 5/0094 |
| 2019/0373573 | A1* | 12/2019 | Cui | G01S 5/10 |
| 2020/0245372 | A1* | 7/2020 | Lei | H04L 27/2602 |
| 2020/0396035 | A1* | 12/2020 | Yu | H04L 5/0089 |
| 2021/0051653 | A1* | 2/2021 | Park | H04W 72/0413 |
| 2021/0051710 | A1* | 2/2021 | Cirik | H04W 74/0833 |
| 2021/0051736 | A1* | 2/2021 | Jeon | H04W 76/11 |
| 2021/0126692 | A1* | 4/2021 | Chung | H04B 7/0452 |
| 2022/0029676 | A1* | 1/2022 | Ramireddy | H04B 7/0626 |

OTHER PUBLICATIONS

LG Electronics: "Discussions on Combination of DL & UL based Positioning", 3GPP Draft, 3GPP TSG RAN WG1 #96, R1-1902101, 3rd Gen Partnership Project (3GPP), Mobile Competence Centre, 650, Route Des Lucioles, F-06921 Sophia-Antipolis Cedex, FR, vol. RAN WG1. No. Athens, GR, Feb. 25, 2019-Mar. 1, 2019, Feb. 6, 2019 (Feb. 16, 2019) XP051599796, 5 pgs, Retrieved from Internet:URL:http://www.3gpp.org/ftp/tsg%5Fran/WG1%5FRL1/TSGR1%5F96/Docs/R1%2D1902101%2Ezip, [retrieved Feb. 16, 2019] chapter 2.1.1, p. 2, last para, p. 3 last two paragraphs; p. 4; fig 2 1st para; p. 5.

Qualcomm Inc: "Combined Downlink and Uplink NR Positioning Procedures", 3GPP Draft, 3GPP TSG-RAN WG2 Mtg #104, R2-1817899, (Positioning Procedures), 3rd Gen Partnership Project (3GPP), Mobile Competence Centre, 650, Route Des Lucioles, F-06921 Sophia-Antipolis Cedex, FR, vol. RAN WG2, No. Spokane, USA, Nov. 12, 2018-Nov. 16, 2018, Nov. 2, 2018 (Nov. 2, 2018), XP051481785, pp. 1-18, Retrieved from Internet:URL: https://www.3gpp.org/ftp/tsg_ran/wg2_rl2/TSGR2_104/Docs/R2-1817899.zip [retrieved Nov. 2, 2018], Paragraphs [001]-[004], p. 4, Figs 1-5.

Qualcomm Incorporated: "Considerations on Phy-layer Procedures for NR Positioning", 3GPP Draft, 3GPP TSG RAN WG1 #98, R1-1909502, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 22, 2019 (Aug. 22, 2019), XP051766103, pp. 1-3, Retrieved from the Internet: URL: http://www.3gpp.org/ftp/tsg_ran/WG1_RL1/TSGR1_98/Docs/R1-1909502.zip, [retrieved on Aug. 22, 2019], pp. 1.3.

* cited by examiner

BEAM-SPECIFIC GROUP DELAY / FREQUENCY LOOKUP TABLE SIGNALING FOR HIGH-PRECISION MULTI-ROUND-TRIP-TIME

CROSS-REFERENCE TO RELATED APPLICATION

The present Application for Patent claims priority under 35 U.S.C. § 119 to Greek Patent Application No. 20190100390, entitled "BEAM-SPECIFIC GROUP DELAY/FREQUENCY LOOKUP TABLE SIGNALING FOR HIGH-PRECISION MULTI-ROUND-TRIP-TIME," filed Sep. 10, 2019, assigned to the assignee hereof, and expressly incorporated herein by reference in its entirety.

INTRODUCTION

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a user equipment (UE) includes a memory, at least one transceiver, and at least one processor communicatively coupled to the memory and the at least one transceiver, the at least one processor configured to receive, from a transmission-reception point (TRP) via the at least one transceiver, a first downlink reference signal on at least one downlink reference signal resource using a downlink receive beam, cause the at least one transceiver to transmit, to the TRP, an uplink reference signal on at least one uplink reference signal resource using an uplink transmit beam, determine a parameter representing a difference between a reception time of the first downlink reference signal and a transmission time of the uplink reference signal, cause the at least one transceiver to transmit the parameter to a network entity, and cause the at least one transceiver to transmit, to the network entity, a first lookup table or an identifier of the first lookup table, wherein the first lookup table represents per-frequency group delay information for the downlink receive beam and/or the uplink transmit beam.

In an aspect, a network entity includes a memory, at least one network interface, and at least one processor communicatively coupled to the memory and the at least one network interface, the at least one processor configured to cause the at least one network interface to transmit, to a user equipment (UE), an identification of at least one downlink reference signal resource to enable the UE to receive, from a TRP, a first downlink reference signal on the at least one downlink reference signal resource using a downlink receive beam, cause the at least one network interface to transmit, to the UE, an identification of at least one uplink reference signal resource to enable the UE to transmit, to the TRP, an uplink reference signal on the at least one uplink reference signal resource using an uplink transmit beam, receive, from the UE via the at least one network interface, a parameter representing a difference between a reception time at the UE of the first downlink reference signal and a transmission time of the uplink reference signal from the UE, and receive, from the UE via the at least one network interface, a first lookup table or an identifier of the first lookup table, wherein the first lookup table represents per-frequency group delay information for the downlink receive beam and/or the uplink transmit beam, estimate a position of the UE based, in part, on the difference between the reception time of the first downlink reference signal and the transmission time of the uplink reference signal and a group delay for the downlink receive beam and/or the uplink transmit beam retrieved from the first lookup table.

In an aspect, a method of wireless communication performed by a UE includes receiving, from a TRP, a first downlink reference signal on at least one downlink reference signal resource using a downlink receive beam, transmitting, to the TRP, an uplink reference signal on at least one uplink reference signal resource using an uplink transmit beam, determining a parameter representing a difference between a reception time of the first downlink reference signal and a transmission time of the uplink reference signal, transmitting the parameter to a network entity, and transmitting, to the network entity, a first lookup table or an identifier of the first lookup table, wherein the first lookup table represents per-frequency group delay information for the downlink receive beam and/or the uplink transmit beam.

In an aspect, a method of wireless communication performed by a network entity includes transmitting, to a UE, an identification of at least one downlink reference signal resource to enable the UE to receive, from a TRP, a first downlink reference signal on the at least one downlink reference signal resource using a downlink receive beam, transmitting, to the UE, an identification of at least one uplink reference signal resource to enable the UE to transmit, to the TRP, an uplink reference signal on the at least one uplink reference signal resource using an uplink transmit beam, receiving, from the UE, a parameter representing a difference between a reception time at the UE of the first downlink reference signal and a transmission time of the uplink reference signal from the UE, receiving, from the UE, a first lookup table or an identifier of the first lookup table, wherein the first lookup table represents per-frequency group delay information for the downlink receive beam and/or the uplink transmit beam, and estimating a position of the UE based, in part, on the difference between the reception time of the first downlink reference signal and the transmission time of the uplink reference signal and a group delay for the downlink receive beam and/or the uplink transmit beam retrieved from the first lookup table.

In an aspect, a UE includes means for receiving, from a TRP, a first downlink reference signal on at least one downlink reference signal resource using a downlink receive beam, means for transmitting, to the TRP, an uplink reference signal on at least one uplink reference signal resource using an uplink transmit beam, means for determining a parameter representing a difference between a reception time of the first downlink reference signal and a transmission time of the uplink reference signal, means for transmitting the parameter to a network entity, and means for transmitting, to the network entity, a first lookup table or an identifier of the first lookup table, wherein the first lookup table represents per-frequency group delay information for the downlink receive beam and/or the uplink transmit beam.

In an aspect, a network entity includes means for transmitting, to a UE, an identification of at least one downlink reference signal resource to enable the UE to receive, from a TRP, a first downlink reference signal on the at least one downlink reference signal resource using a downlink receive beam, means for transmitting, to the UE, an identification of at least one uplink reference signal resource to enable the UE to transmit, to the TRP, an uplink reference signal on the at least one uplink reference signal resource using an uplink transmit beam, means for receiving, from the UE, a parameter representing a difference between a reception time at the UE of the first downlink reference signal and a transmission time of the uplink reference signal from the UE, means for receiving, from the UE, a first lookup table or an identifier of the first lookup table, wherein the first lookup table represents per-frequency group delay information for the downlink receive beam and/or the uplink transmit beam, and means for estimating a position of the UE based, in part, on the difference between the reception time of the first downlink reference signal and the transmission time of the uplink reference signal and a group delay for the downlink receive beam and/or the uplink transmit beam retrieved from the first lookup table.

In an aspect, a non-transitory computer-readable medium storing computer-executable instructions includes computer-executable instructions comprising: at least one instruction instructing a UE to receive, from a TRP, a first downlink reference signal on at least one downlink reference signal resource using a downlink receive beam, at least one instruction instructing the UE to transmit, to the TRP, an uplink reference signal on at least one uplink reference signal resource using an uplink transmit beam, at least one instruction instructing the UE to determine a parameter representing a difference between a reception time of the first downlink reference signal and a transmission time of the uplink reference signal, at least one instruction instructing the UE to transmit the parameter to a network entity, and at least one instruction instructing the UE to transmit, to the network entity, a first lookup table or an identifier of the first lookup table, wherein the first lookup table represents per-frequency group delay information for the downlink receive beam and/or the uplink transmit beam.

In an aspect, a non-transitory computer-readable medium storing computer-executable instructions includes computer-executable instructions comprising: at least one instruction instructing a network entity to transmit, to a UE, an identification of at least one downlink reference signal resource to enable the UE to receive, from a TRP, a first downlink reference signal on the at least one downlink reference signal resource using a downlink receive beam, at least one instruction instructing the network entity to transmit, to the UE, an identification of at least one uplink reference signal resource to enable the UE to transmit, to the TRP, an uplink reference signal on the at least one uplink reference signal resource using an uplink transmit beam, at least one instruction instructing the network entity to receive, from the UE, a parameter representing a difference between a reception time at the UE of the first downlink reference signal and a transmission time of the uplink reference signal from the UE, at least one instruction instructing the network entity to receive, from the UE, a first lookup table or an identifier of the first lookup table, wherein the first lookup table represents per-frequency group delay information for the downlink receive beam and/or the uplink transmit beam, and at least one instruction instructing the network entity to estimate a position of the UE based, in part, on the difference between the reception time of the first downlink reference signal and the transmission time of the uplink reference signal and a group delay for the downlink receive beam and/or the uplink transmit beam retrieved from the first lookup table.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
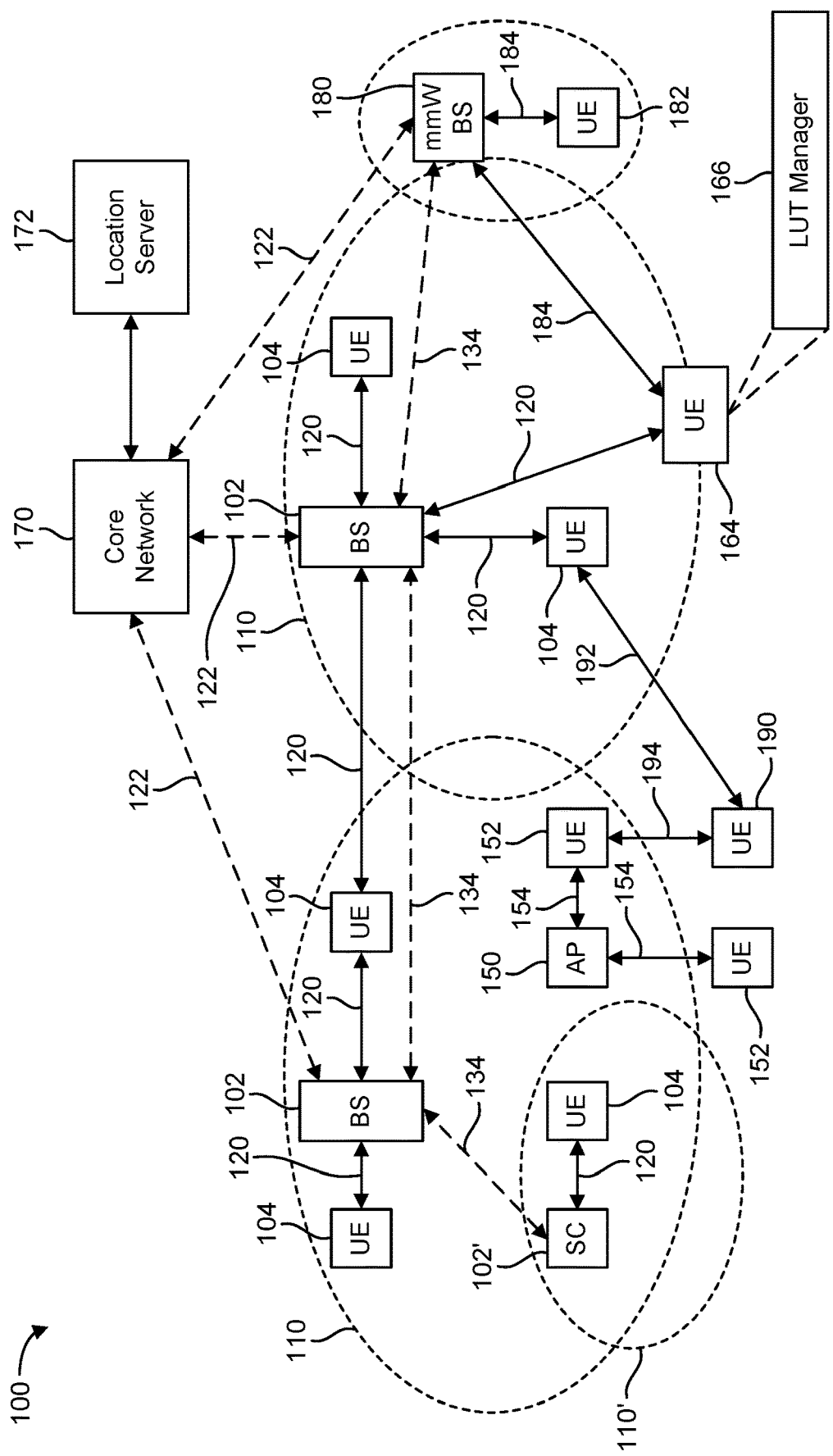
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity).

In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a LUT manager 166 that may enable the UE 164 to perform the UE operations described herein. Note that although only one UE in FIG. 1 is illustrated as having a LUT manager 166, any of the UEs in FIG. 1 may be configured to perform the UE operations described herein.

Figure 2A:
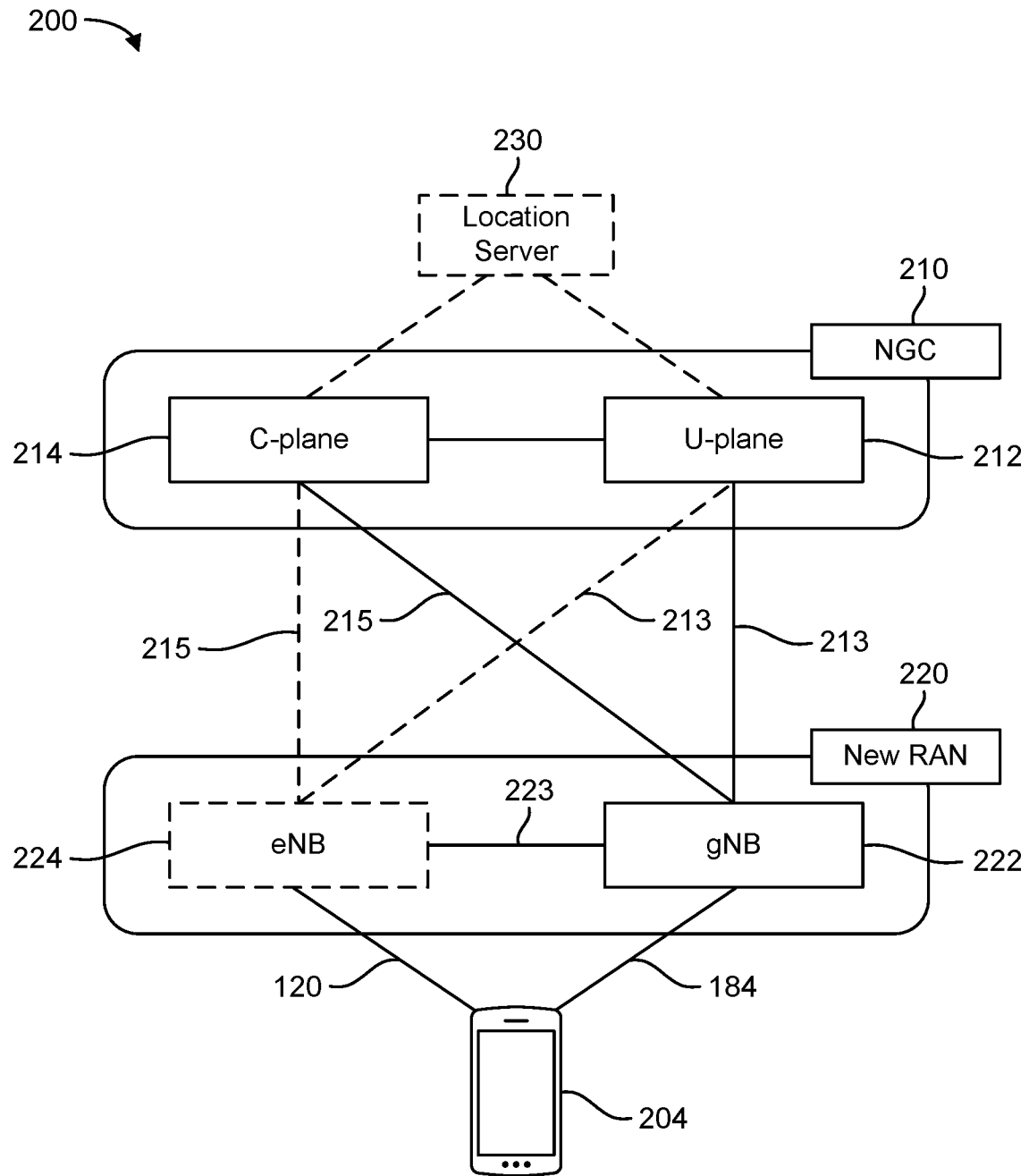
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230 (which may correspond to location server 172), which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
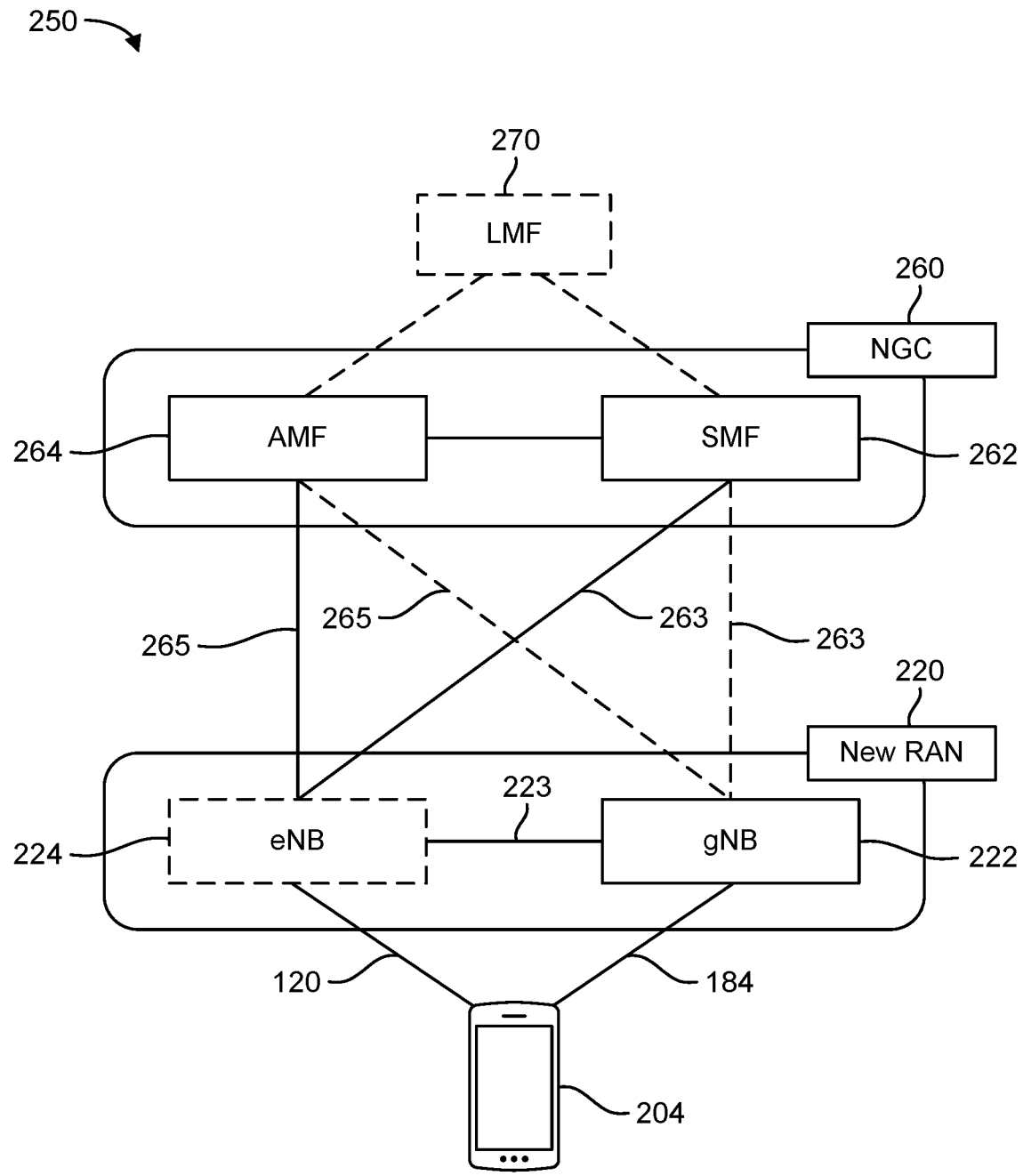

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
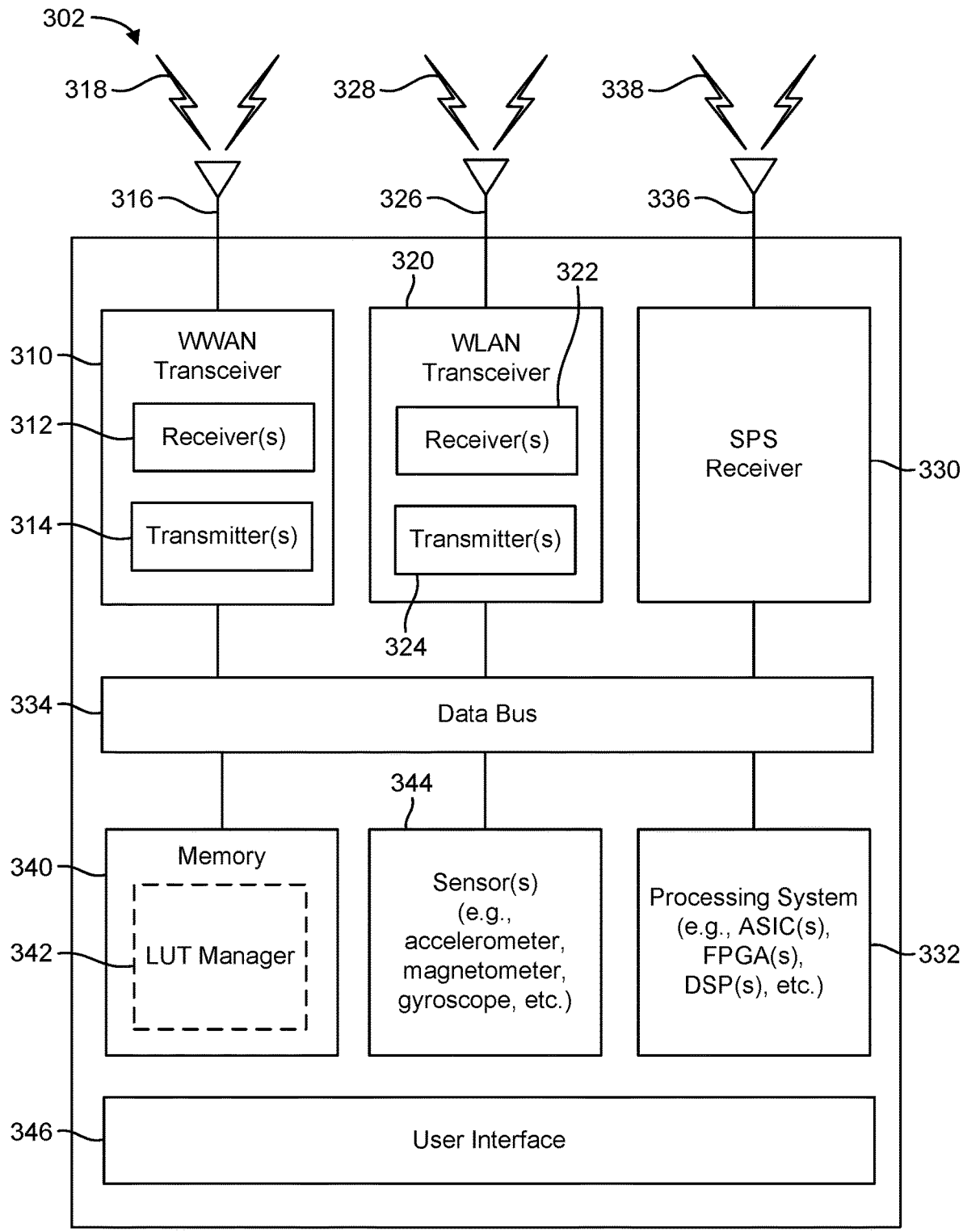
FIGS. 3A to 3C are simplified block diagrams of several sample aspects of components that may be employed in wireless communication nodes and configured to support communication as taught herein.
Figure 3B:
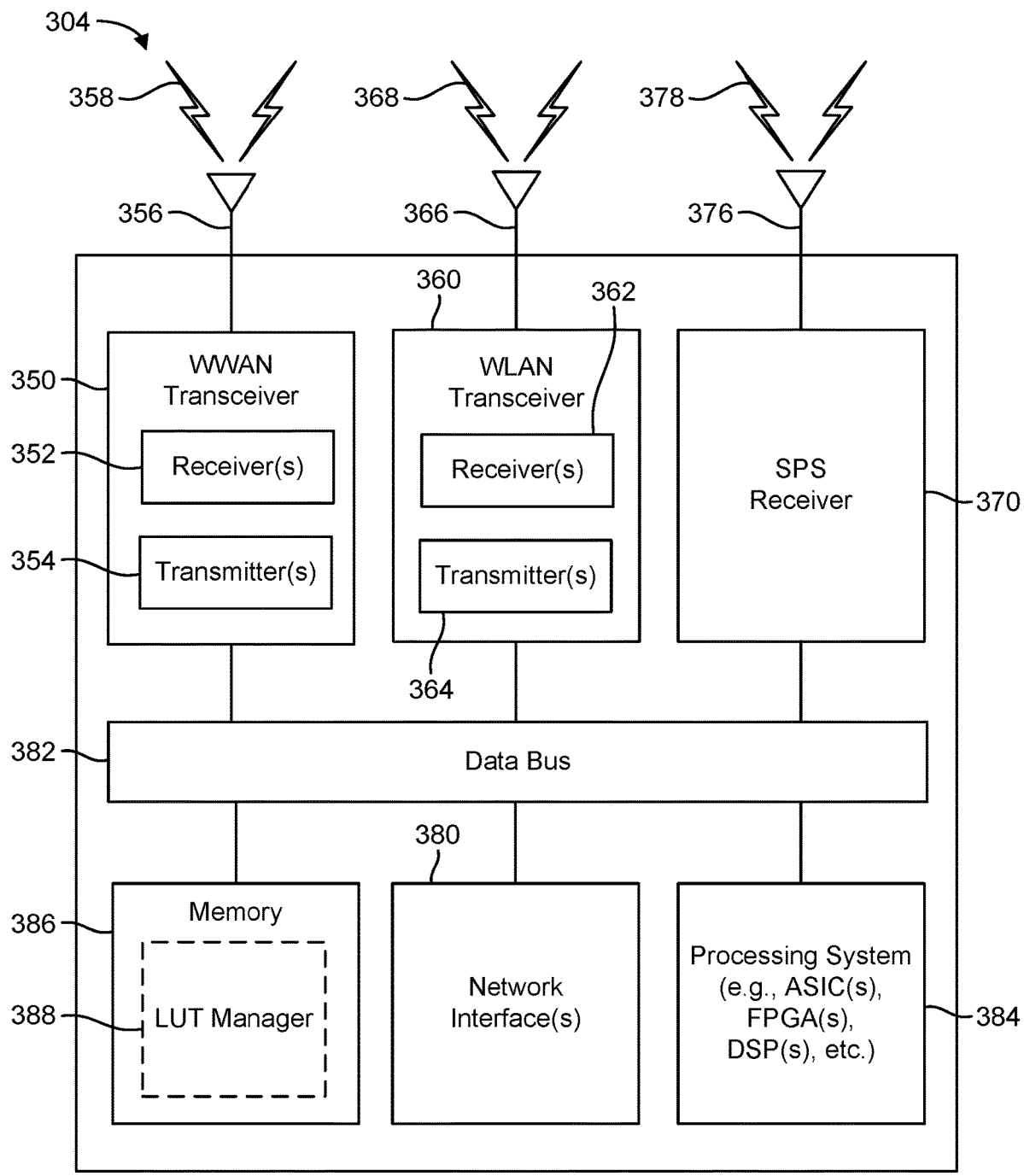
Figure 3C:
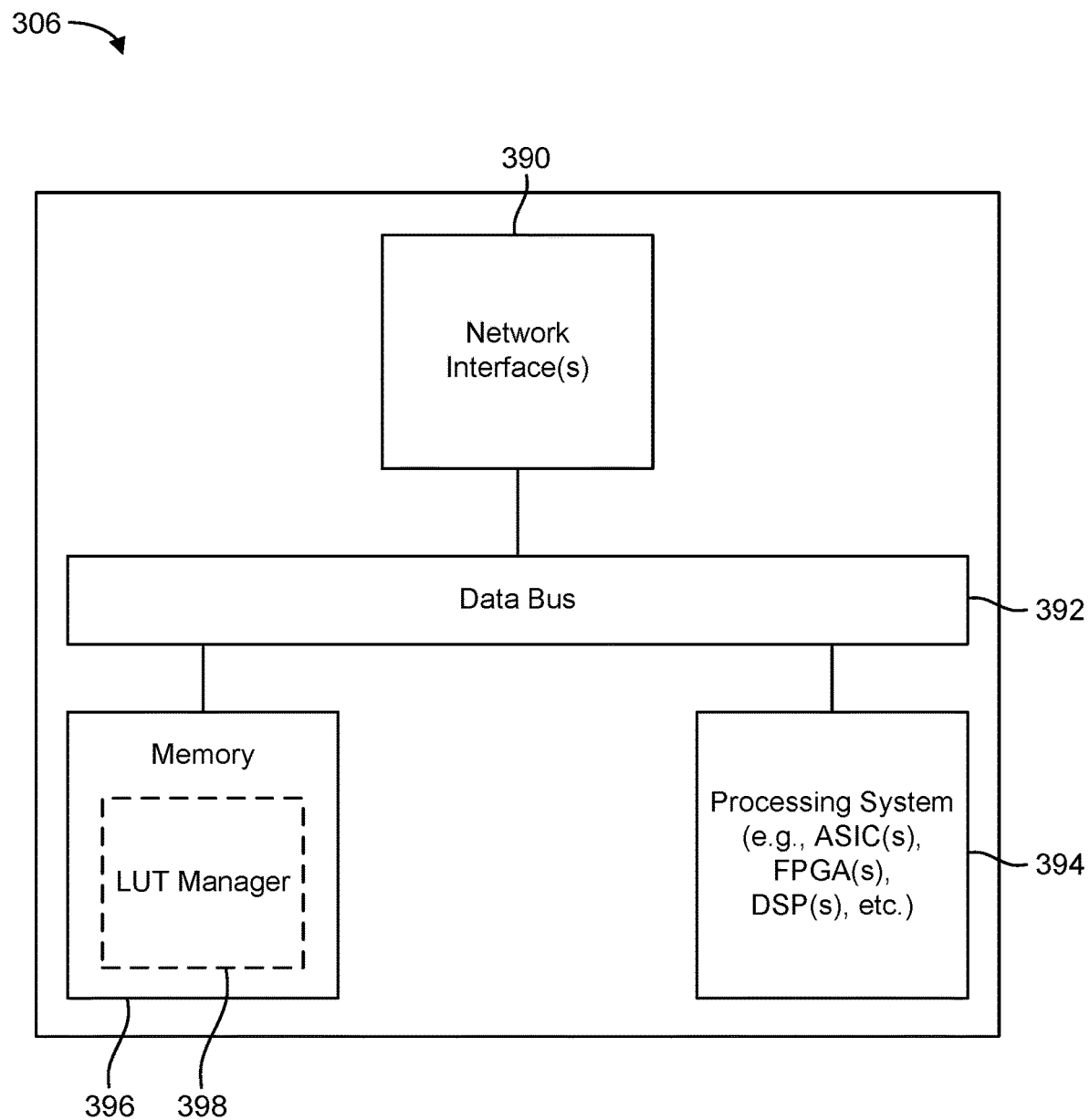

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, RTT positioning as disclosed herein and for providing other processing functionality. The base station 304 includes a processing system 384 for providing functionality relating to, for example, RTT positioning as disclosed herein and for providing other processing functionality. The network entity 306 includes a processing system 394 for providing functionality relating to, for example, RTT positioning as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include LUT managers 342, 388, and 398, respectively. The LUT managers 342, 388, and 398 may be hardware circuits that are part of or coupled to the processing systems 332, 384, and 394, respectively, that, when executed, cause the apparatuses 302, 304, and 306 to perform the functionality described herein. In other aspects, the LUT managers 342, 388, and 398 may be external to the processing systems 332, 384, and 394 (e.g., part of a modem processing system, integrated with another processing system, etc.). Alternatively, the LUT managers 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE, base station, network entity, etc., such as the processing systems 332, 384, 394, the transceivers 310, 320, 350, and 360, the memory components 340, 386, and 396, the LUT managers 342, 388, and 398, etc.

Figure 4:
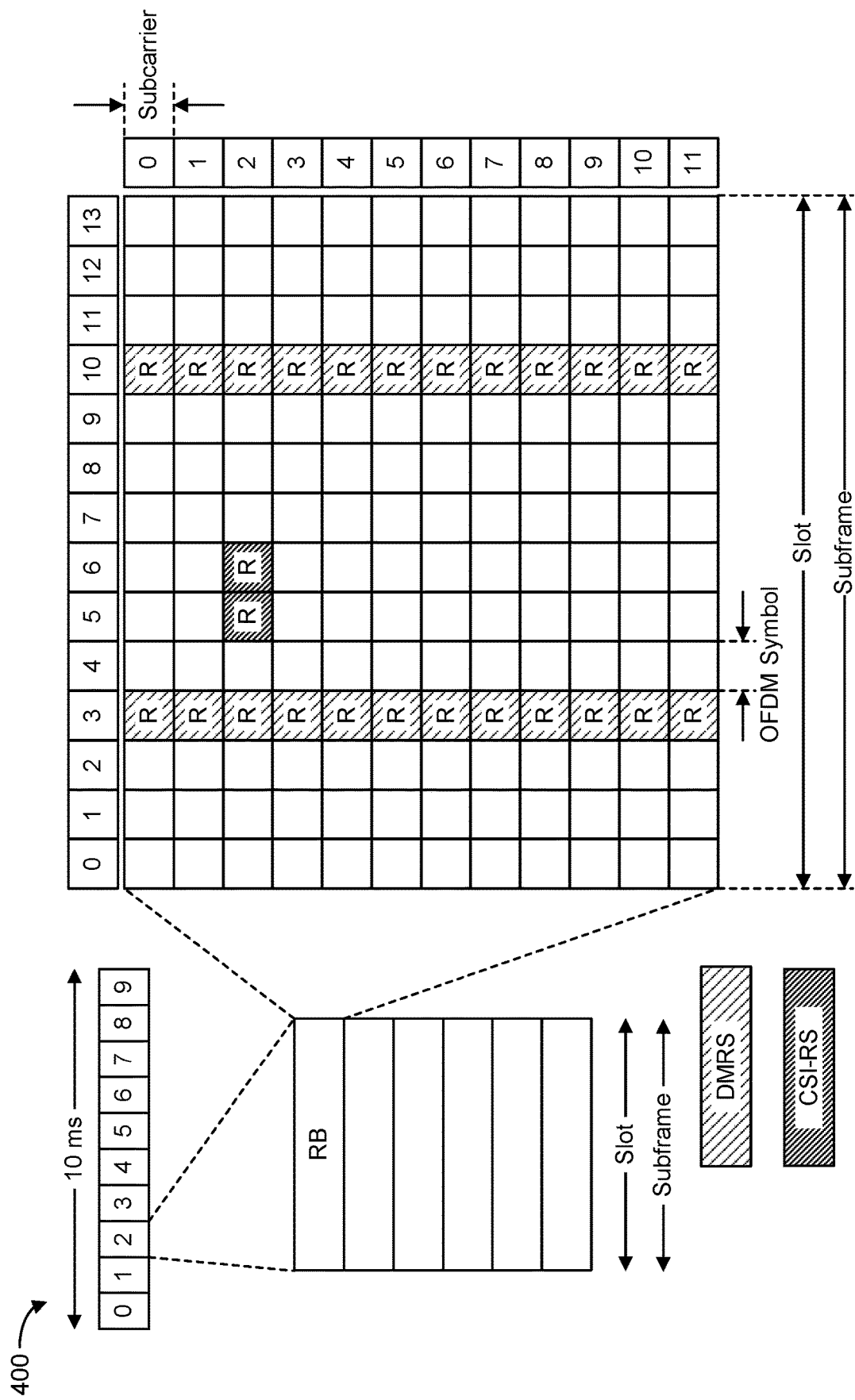
FIG. 4 is a diagram illustrating an example of a frame structure for use in a wireless telecommunications system according to an aspect of the disclosure.

Time intervals of a communications resource in LTE or 5G NR may be organized according to radio frames. FIG. 4 is a diagram 400 illustrating an example of a DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (µs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

In the example of FIG. 4, a numerology of 15 kHz is used. Thus, in the time domain, a frame (e.g., 10 milliseconds (ms)) is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols (for DL, OFDM symbols; for UL, SC-FDMA symbols) in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4.

In some cases, the CSI-RS illustrated in FIG. 4 may be positioning reference signals (PRS). A collection of resource elements that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, tracking reference signals (TRS), cell-specific reference signals (CRS), channel state information reference signals (CSI-RS), primary synchronization signals (PSS), secondary synchronization signals (SSS), etc.

In NR, there may not be a requirement for precise timing synchronization across the network. Instead, it may be sufficient to have coarse time-synchronization across gNBs (e.g., within a cyclic prefix (CP) duration of the OFDM symbols). RTT-based methods generally only need coarse timing synchronization, and as such, may be a preferred positioning method in NR.

In a network-centric RTT estimation, the serving base station (e.g., a base station 102) instructs the UE (e.g., a UE 104) to scan for/receive RTT measurement signals (e.g., PRS) on serving cells of two or more neighboring base stations (and typically the serving base station, as at least three base stations are needed). The one or more base stations transmit RTT measurement signals on low reuse resources (e.g., resources used by the base station to transmit system information) allocated by the network (e.g., location server 230, LMF 270). The UE records the arrival time (also referred to as a receive time, a reception time, a time of reception, or a time of arrival (ToA)) of each RTT measurement signal relative to the UE's current downlink timing (e.g., as derived by the UE from a downlink signal received from its serving base station), and transmits a common or individual RTT response message (e.g., SRS, UL-PRS) to the one or more base stations (e.g., when instructed by its serving base station) and may include the difference $T_{Rx \rightarrow Tx}$ (e.g., $T_{Rx \rightarrow Tx}$ 612 in FIG. 6A) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ (e.g., $T_{Tx \rightarrow Rx}$ 622 in FIG. 6A) between the transmission time of the RTT measurement signal and the ToA of the RTT response to the UE-reported difference $T_{Rx \rightarrow Tx}$ (e.g., $T_{Rx \rightarrow Tx}$ 612 in 6A), the base station (or positioning entity) can deduce the propagation time between the base station and the UE, from which it can then determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

Figure 5:
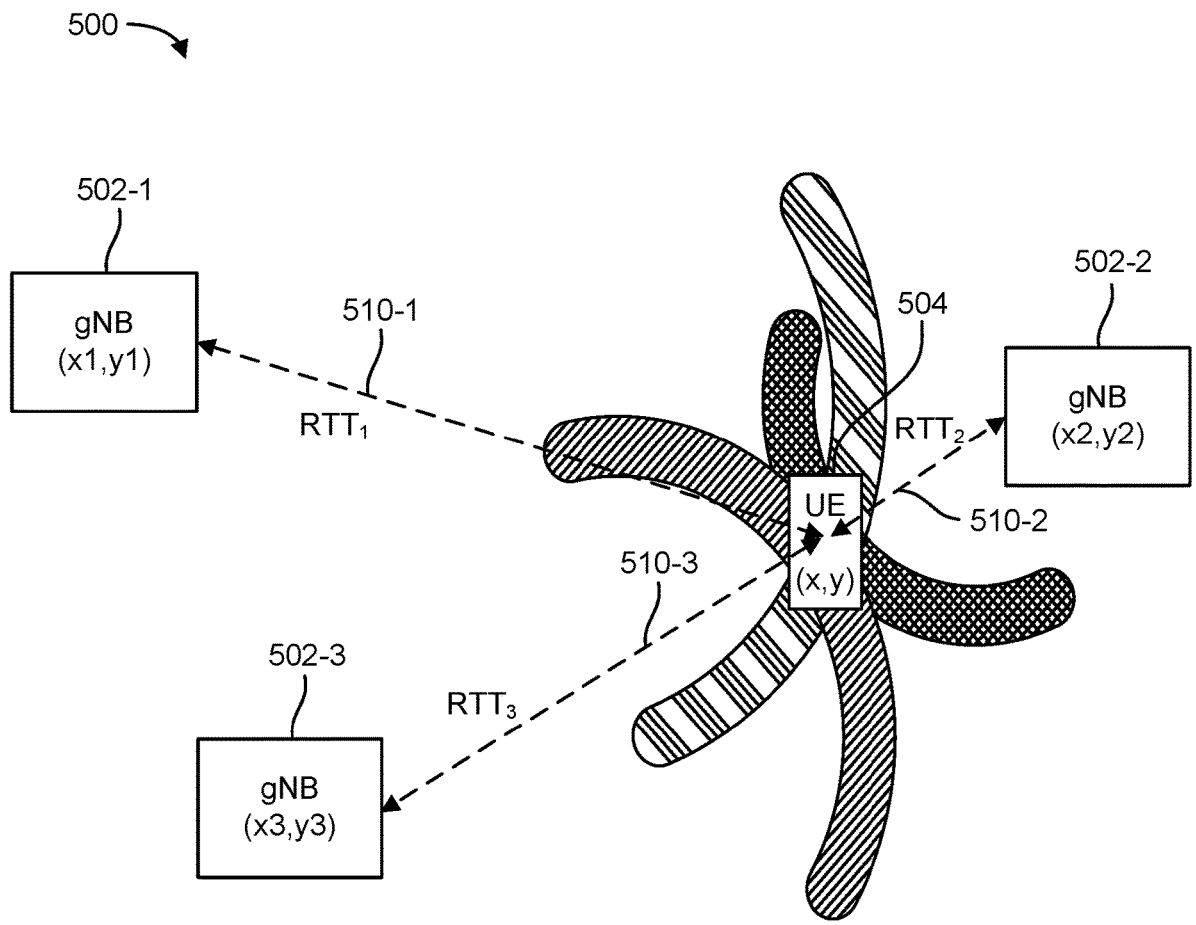
FIG. 5 is a diagram illustrating an exemplary technique for determining a position of a UE using information obtained from a plurality of base stations.

FIG. 5 illustrates an exemplary wireless communications system 500 according to aspects of the disclosure. In the example of FIG. 5, a UE 504 (which may correspond to any of the UEs described herein) is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 (collectively, base stations 502, and which may correspond to any of the base stations described herein) using RF signals and standardized protocols for the modulation of the RF signals and the exchange of information packets. By extracting different types of information from the exchanged RF signals, and utilizing the layout of the wireless communications system 500 (i.e., the base stations' locations, geometry, etc.), the UE 504 may determine its position, or assist in the determination of its position, in a predefined reference coordinate system. In an aspect, the UE 504 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 504 and three base stations 502, as will be appreciated, there may be more UEs 504 and more base stations 502.

To support position estimates, the base stations 502 may be configured to broadcast reference RF signals (e.g., PRS, NRS, CRS, TRS, CSI-RS, PSS, SSS, etc.) to UEs 504 in their coverage area to enable a UE 504 to measure characteristics of such reference RF signals. For example, the UE 504 may measure the ToA of specific reference RF signals transmitted by at least three different base stations 502 and may use the RTT positioning method to report these ToAs (and additional information) back to the serving base station 502 or another positioning entity (e.g., location server 230, LMF 270).

In an aspect, although described as the UE 504 measuring reference RF signals from a base station 502, the UE 504 may measure reference RF signals from one of multiple cells supported by a base station 502. Where the UE 504 measures reference RF signals transmitted by a cell supported by a base station 502, the at least two other reference RF signals measured by the UE 504 to perform the RTT procedure would be from cells supported by base stations 502 different from the first base station 502 and may have good or poor signal strength at the UE 504.

In order to determine the position (x, y) of the UE 504, the entity determining the position of the UE 504 needs to know the locations of the base stations 502, which may be represented in a reference coordinate system as $(x_k, y_k)$, where k=1, 2, 3 in the example of FIG. 5. Where one of the base stations 502 (e.g., the serving base station) or the UE 504 determines the position of the UE 504, the locations of the involved base stations 502 may be provided to the serving base station 502 or the UE 504 by a location server with knowledge of the network geometry (e.g., location server 230, LMF 270). Alternatively, the location server may determine the position of the UE 504 using the known network geometry.

Either the UE 504 or the respective base station 502 may determine the distance ($d_k$, where k=1, 2, 3) between the UE 504 and the respective base station 502. In an aspect, determining the RTT 510 of signals exchanged between the UE 504 and any base station 502 can be performed and converted to a distance ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 504 and the base stations 502 are the same. However, such an assumption may not be true in practice.

Once each distance $d_k$ is determined, the UE 504, a base station 502, or the location server (e.g., location server 230, LMF 270) can solve for the position (x, y) of the UE 504 by using a variety of known geometric techniques, such as, for example, trilateration. From FIG. 5, it can be seen that the position of the UE 504 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 504 from the location of a base station 502). The intersection of the two directions at or near the point (x, y) can provide another estimate of the location for the UE 504.

A position estimate (e.g., for a UE 504) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 6A:
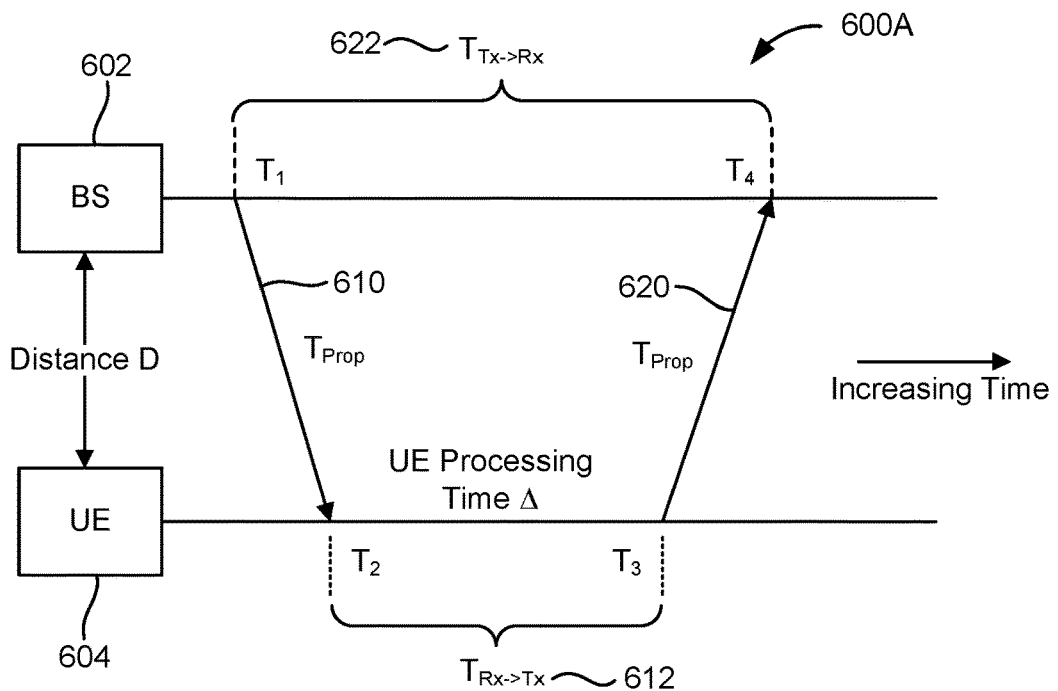
FIGS. 6A and 6B are diagrams showing exemplary timings of round-trip-time (RTT) measurement signals exchanged between a base station and a UE, according to aspects of the disclosure.

FIG. 6A is a diagram 600A showing exemplary timings of RTT measurement signals exchanged between a base station 602 (e.g., any of the base stations described herein) and a UE 604 (e.g., any of the UEs described herein), according to aspects of the disclosure. In the example of FIG. 6A, the base station 602 sends an RTT measurement signal 610 (e.g., PRS, NRS, CRS, TRS, CSI-RS, PSS, SSS, etc.) to the UE 604 at time $T_1$. The RTT measurement signal 610 has some propagation delay $T_{Prop}$ as it travels from the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 at time $T_3$. After the propagation delay $T_{Prop}$, the base station 602 receives/measures the RTT response signal 620 from the UE 604 at time $T_4$ (the ToA of the RTT response signal 620 at the base station 602).

In order to identify the ToA (e.g., $T_2$) of a reference signal (e.g., an RTT measurement signal 610) transmitted by a given network node (e.g., base station 602), the receiver (e.g., UE 604) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may chose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

The RTT response signal 620 may explicitly include the difference between time $T_3$ and time $T_2$ (i.e., $T_{Rx \to Tx}$ 612). Alternatively, it may be derived from the timing advance (TA), i.e., the relative UL/DL frame timing and specification location of UL reference signals. (Note that the TA is usually the RTT between the base station and the UE, or double the propagation time in one direction.) Using this measurement and the difference between time $T_4$ and time $T_1$ (i.e., $T_{Tx \to Rx}$ 622), the base station 602 (or other positioning entity, such as location server 230, LMF 270) can calculate the distance to the UE 604 as:

$$d = \frac{1}{2c}(T_{Tx \to Rx} - T_{Rx \to Tx}) = \frac{1}{2c}(T_4 - T_1) - \frac{1}{2c}(T_3 - T_2)$$

where c is the speed of light.

Figure 6B:
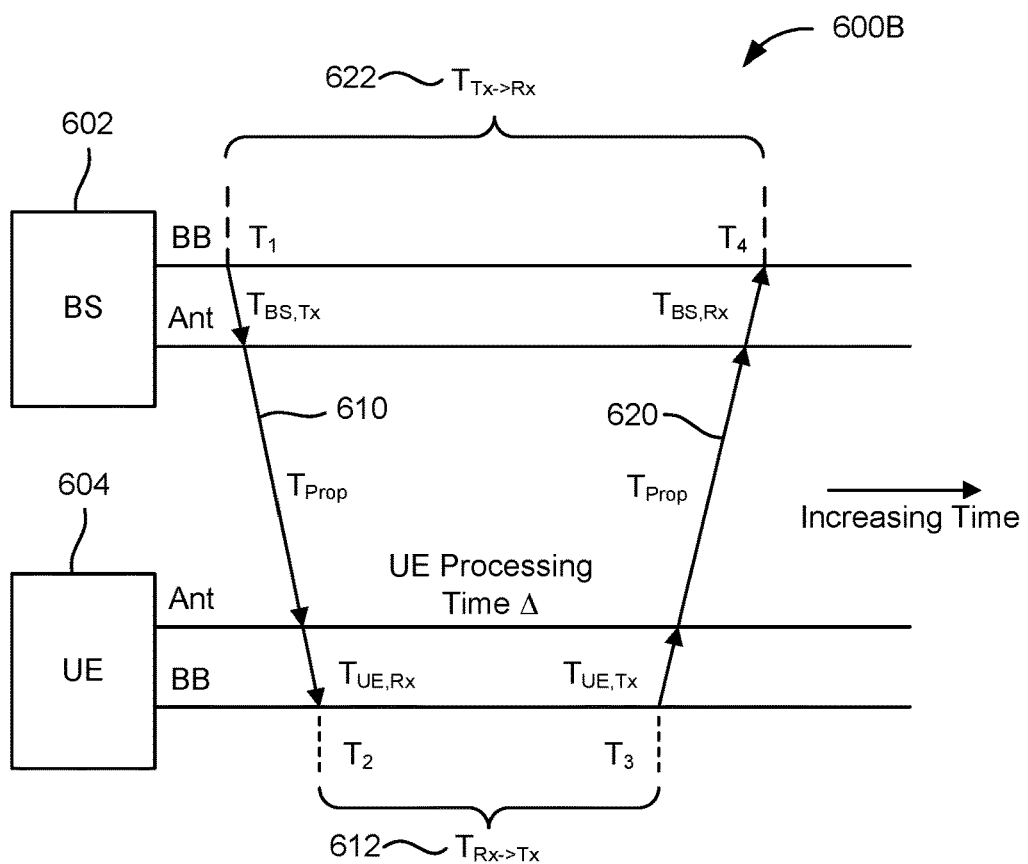

FIG. 6B is a diagram 600B showing exemplary timings of RTT measurement signals exchanged between the base station 602 and the UE 604, according to aspects of the disclosure. The diagram 600B is similar to the diagram 600A, except that it includes processing delays that occur at both the base station 602 and the UE 604 when transmitting and receiving the RTT measurement signal 610 and RTT response signal 620.

Specifically, on the base station 602 side, there is a transmission delay of $T_{gNB,Tx}$ between the time the base station's 602 baseband (BB) generates the RTT measurement signal 610 and the antenna (Ant) transmits the RTT measurement signal 610. On the UE 604 side, there is a reception delay of $T_{UE,Rx}$ between the time the UE's 604 antenna receives/detects the RTT measurement signal 610 and the time the baseband processes the RTT measurement signal 610. Similarly, for the RTT response signal 620, there is a transmission delay of $T_{UE,Tx}$ between the time the UE's 104 baseband generates the RTT response signal 620 and the antenna transmits the RTT response signal 620. On the base station 602 side, there is a reception delay of $T_{gNB,Rx}$ between the time the base station's 602 antenna receives/detects the RTT response signal 620 and the time the baseband processes the RTT response signal 620.

The delay between the baseband and the antenna is referred to as the RF front-end (RFFE) group delay. Group delay is the time delay of the amplitude envelopes (the smooth curve outlining the extremes of a sinusoidal wave) of the various sinusoidal components of an RF signal through a device (e.g., UE 604, base station 602), and is a function of frequency for each sinusoidal component. In an aspect, the UE 604, for example, may know the average group delay (e.g., across other factors that could affect the group delay in a specific frequency, such as temperature, construction/fabrication errors, etc.) and the standard deviation around it, and may therefore be able to compensate for (i.e., calibrate out) the average group delay. Alternatively, the UE 604 may know the average group delay and the standard deviation but may not calibrate anything out. The average group delay and the standard deviation of the average group delay are referred to herein as group delay information.

The base station 602 compensates for its own RFFE group delays to determine the actual transmission and reception times of the RTT measurement signal 610 and RTT response signal 620, respectively. The base station 602 (or other positioning entity, such as location server 230, LMF 270) can then determine the actual propagation delay $T_{Prop}$ between the base station 602 and the UE 604, and therefore, the distance between the base station 602 and the UE 604. Alternatively, the UE 604 may report its RFFE group delays, rather than compensate for them itself, and the base station 602 (or other positioning entity) subtracts the reported RFFE group delays to determine the propagation delay $T_{Prop}$ and the final distance between the base station 602 and the UE 604.

The UE 604 can perform an RTT procedure with multiple base stations 604. However, the RTT procedure does not require synchronization between these base stations 602.

With respect to downlink beam management, several options are currently supported to assist a UE to perform receive beamforming for positioning purposes. As a first option, the downlink PRS to be measured as the RTT measurement signal (e.g., RTT measurement signal 610) can be configured to be QCL Type D with a downlink reference signal from the serving cell or a neighboring cell. As a second option, the UE can perform receive beam sweeping on downlink PRS resources that are transmitted with the same downlink spatial domain transmission filter. As a third option, the UE may use a fixed receive beam to receive downlink PRS resources that are transmitted with different downlink spatial domain transmission filters.

Several options are currently supported for uplink beam management/alignment towards the serving cell and neighbouring cells for positioning purposes. As a first option, a spatial relation may be configured between a reference downlink reference signal from the serving cell or neighbouring cells and the target SRS. Reference downlink reference signals that can be used include at least the SSB transmitted on a cell. As a second option, the UE can perform transmit beam sweeping of uplink SRS transmissions across multiple uplink SRS resources. As a third option, the UE may use a fixed transmit beam for uplink SRS transmissions across multiple uplink SRS resources, for both FR1 and FR2. Note that currently, a UE is not expected to transmit multiple SRS resources with different spatial relations in the same OFDM symbol, as was previously the case.

Referring to group delay in greater detail, there are a number of sources of variation in a UE's group delay. An accurately estimated group delay is important because it affects positioning accuracy. Generally, one nanosecond (ns) in time translates to one foot in positioning accuracy. Thus, a 5 ns difference between two group delays translates to a 5-foot (ft) difference in position. While this may be sufficiently accurate for some applications, for high-accuracy positioning scenarios (e.g., centimeter level accuracy), this is unacceptable.

One source of variation in group delay is part-specific (for both analog and digital paths). That is, the physical parts, or components, of the UE, for both analog and digital paths, contribute to the group delay. To determine the resultant group delay, a reference design (multiple instances) should be tested to measure part-to-part variation. Customers and vendors with proprietary designs generally do their own testing, and provide this information in, for example, application notes or as part of a software release. This testing also includes third-party components, as it is the designer's responsibility to use good parts.

Figure 7:
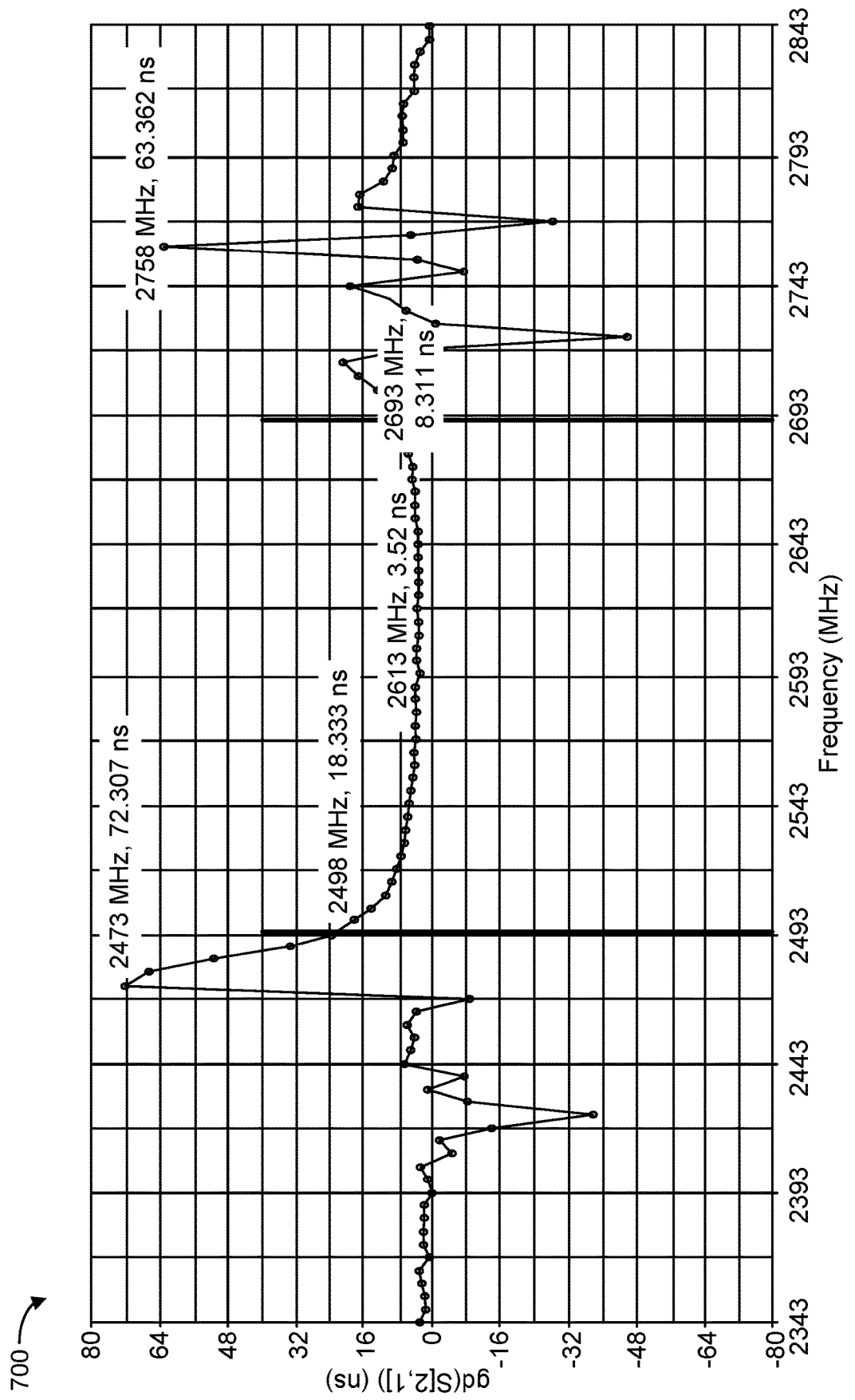
FIG. 7 illustrates a graph comparing group delay to frequency, according to aspects of the disclosure.

Another source of variation is frequency-specific. For example, the group delay for the lower and upper edges of the 5 GHz frequency band can differ by 500 picoseconds (ps). Thus, the group delay of a signal received on one subcarrier may be different than the group delay of a signal received on a different subcarrier. FIG. 7 illustrates a graph 700 comparing group delay (on the Y axis) to frequency (on the X axis), according to aspects of the disclosure. A particular 200 MHz frequency band (2493 MHz to 2693 MHz) is shown between the two vertical lines. Within that frequency band, the UE components have been designed to make the group delay as constant as possible. However, this is not entirely possible; hence the "U" shape of the graph between the vertical lines. For example, as shown in FIG. 7, at a frequency of 2498 MHz, there is a group delay of 18.333 ns, whereas at a frequency of 2613 MHz, there is a group delay of 3.52 ns. To determine the possible group delays per frequency band, the UE should calibrate per channel in the band, although some channels may be avoided for RTT and therefore would not need to be tested.

Yet another source of variation is path-specific. That is, the group delay can vary depending on the selected antenna or antenna panel, the transmission power/processing, and/or the receive power/processing. Another source of variation is temperature-specific. This can be addressed with a calibration table for temperature. Other errors that can affect group delay include calibration error (e.g., technical or procedural), measurement precision, etc.

Another source of variation in group delay, addressed in the present disclosure, is beam-specific. Not only does the group delay vary per frequency, as discussed above with reference to FIG. 7, but also, based on the particular receive/transmit beam(s) used within that frequency. This is because different sets of antenna elements of an antenna panel form different beams, and therefore, different beams will have different physical characteristics. Accordingly, the present disclosure describes techniques for reporting the beam-specific delay for a frequency.

In an aspect, a UE may report a group delay-per-frequency look up table (LUT) for different transmit and receive beams. The LUT may be a set of frequency bins, each one associated with a group delay (in, e.g., nanoseconds). For example, the graph 700 in FIG. 7 may represent the group delay per frequency for a particular beam/PRS resource. Rather than reporting a function that represents the curve for the example frequency band (i.e., the "U" curve between the two vertical lines in FIG. 7), the UE discretizes the curve into a set of frequency bins (e.g., 10 MHz or 50 MHz in size), and reports the group delay associated with each frequency bin. The UE also reports the beam ID (or PRS resource ID or SRS resource ID, since a downlink beam is generally associated with a PRS resource and an uplink beam is generally associated with an SRS resource) for which the group delay per frequency bin is applicable.

To achieve this, the location server (e.g., location server 230, LMF 270) configures the PRS resources, PRS resource sets, SRS resources, and SRS resource sets to the UE in positioning assistance data (e.g., LTE positioning protocol (LPP) assistance data). Each PRS resource and PRS resource set may be configured to be QCL Type D with a source downlink reference signal from the serving cell or a neighboring cell. Likewise, each SRS resource and SRS resource set may be spatially related to a reference downlink reference signal. The UE can then report, either with the UE Rx-Tx parameter (e.g., $T_{Rx \to Tx}$ 612) or in a separate transmission, the LUT table for each PRS resource ID, PRS resource set ID, SRS resource, and SRS resource set ID used to calculate the UE Rx-Tx parameter. In that way, the location server can look up the group delays for the frequencies on which the PRS and SRS resources were transmitted and subtract them from the UE Rx-Tx parameter.

In an aspect, the UE may report LUT(s) before being configured with PRS/SRS resources and calculating the UE Rx-Tx parameter. For example, the UE may report the LUTs in capability information (e.g., one or more LPP capability messages). In this scenario, the UE can only provide a range of group delays per frequency across different beams. For example, for a 28100 MHz carrier, the group delay may range from 10 ns to 30 ns depending on the choice of beam. In this case, the location server would not be able to explicitly associate each beam to a delay per frequency, but it could use this information to weight the received measurements accordingly.

For example, the UE may report 16 LUTs to the location server in capability information (e.g., LPP capability message) for the UE. The location server may then configure the UE with some set of PRS resources (i.e., some PRS resource set(s)), each PRS resource associated with a downlink beam from a base station. Then, when reporting the value of the UE Rx-Tx parameter (e.g., $T_{Rx \to Tx}$ 612) calculated for a particular PRS resource, the UE can also report that the location server should use, for example, LUT "15" for downlink beam "10." Note that the UE does not need to explicitly identify that for a particular beam ID a particular LUT should be used to determine the group delay for that beam ID. Rather, the beam ID may be implicit, insofar as the UE reports the LUT for a PRS resource ID, and the identified PRS resource is received over a particular beam having a particular beam ID.

In an aspect, when the UE reports at one time all of the LUTs for all of the PRS resources, PRS resource sets, etc. with which it has been configured (e.g., as capability information), it may associate each LUT with an identifier. In that way, when the UE reports the UE Rx-Tx parameter (e.g., $T_{Rx \to Tx}$ 612), it can simply report the ID(s) of the applicable LUT(s). This saves the overhead of transmitting the entire LUT in a report. For example, a 200 MHz frequency band with 20 MHz frequency bins would result in 10 bins. Since the group delay is reported at the nanosecond level, each frequency bin would need 8 bits to report the group delay for that bin, for a total of 800 bits for the entire LUT.

Alternatively, rather than reporting all of the LUTs at once, the UE may instead report only the LUT(s) for the PRS and SRS resources used to calculate the UE Rx-Tx parameter. The UE may still, however, assign an identifier to each LUT in case it can reuse the LUT(s) in the future. Note that as used herein, references to a UE reporting an LUT means that the UE is either transmitting the entire LUT or an identifier of the LUT, unless otherwise specified. Similarly, references to a base station or location server receiving an LUT means that the base station or location server is receiving the entire LUT or an identifier of the LUT, unless otherwise specified.

In an aspect, the LUTs used to calculate the UE Rx-Tx parameter may be signaled in an information element (IE) comprising a sequence of tables. Each table may correspond to a carrier frequency upon which a PRS resource or an SRS resource was transmitted. Each table may be associated with an identifier and comprise a sequence of values corresponding to a sequence of frequency bins of the carrier frequency. Each value of the sequence of values would represent a group delay in nanoseconds for the corresponding frequency bin. Such an IE may be a field in an LPP message.

As discussed above with reference to FIG. 6B, a UE may know the average group delay and the standard deviation around it and therefore be able to compensate for (i.e., calibrate out) the average group delay. Alternatively, the UE may know the average group delay and the standard deviation but may not calibrate anything out. In both cases, the standard deviation may be different for different beams and frequencies. As such, in an aspect, the UE may report an LUT for both the average group delay (if the UE is not calibrating it out) and the standard deviation of the average group delay. If the UE is calibrating out the average group delay, it may still report the standard deviation in an LUT.

In an aspect, if the UE reports only one LUT for a UE Rx-Tx parameter, then the base station can assume that it applies to all beams (uplink and downlink) used to calculate the UE Rx-Tx parameter. If the UE reports two LUTs, then the base station may assume that the first LUT applies to the transmit beam/SRS resource (on which the RTT response signal is transmitted) and the second applies to the receive beam/PRS resource (on which the RTT measurement signal is received), or vice versa.

In an aspect, if the UE has previously reported LUTs (e.g., in a previous positioning session), then, unless the UE updates the association between an LUT and a PRS/SRS resource, it will not need to report the LUT(s) again. Instead, it need only report any new/updated LUT(s). However, the location server (e.g., location server 230, LMF 270) may trigger the UE to re-report the LUT(s) if it determines that they need to be updated (e.g., after some threshold period of time).

In an aspect, the UE may report multiple LUTs in a differential manner. For example, the UE may report a first LUT for a first PRS resource ID, and then provide the remaining LUT(s) for the remaining RPS resource ID(s) differentially. That is, the UE would simply report the differences between the first LUT and the subsequent LUT(s), rather than the entire table for the subsequent LUT(s).

Figure 8A:
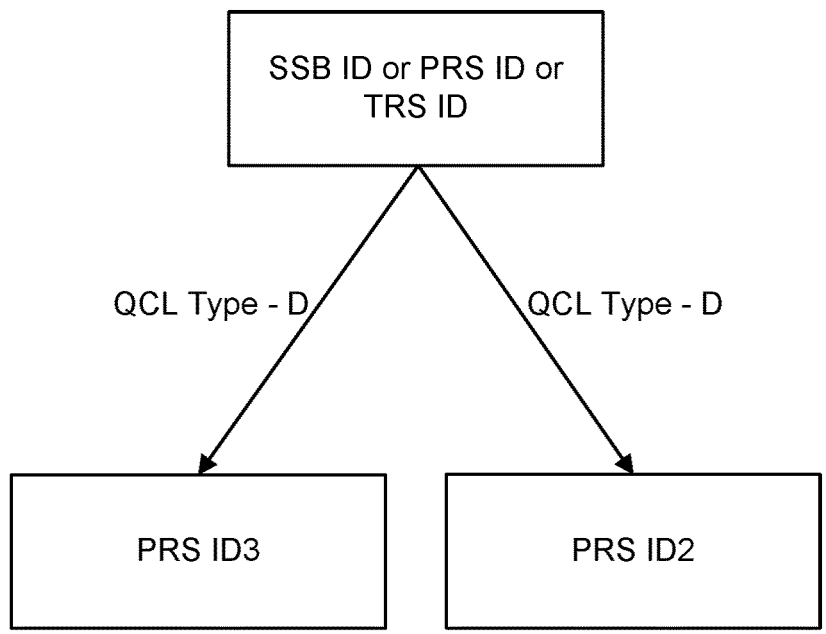
FIG. 8A illustrates two downlink reference signal resources having the same quasi-collocation source reference signal, according to aspects of the disclosure.

In an aspect, an LUT may not be associated with a PRS resource ID, but rather, with the downlink reference signal used as the QCL Type D source reference signal for the PRS resource. For example, as illustrated in FIG. 8A, if two PRS resources (labeled "PRS ID2" and "PRS ID3" in FIG. 8A) have the same QCL Type-D source reference signal, such as the same SSB, PRS, or TRS, then there is no need for the UE to send the two LUTs for the two PRS resources to the location server. Rather, since the UE is expected to receive the two PRS resources (i.e., PRS ID2 and PRS ID3) with the same beam as it receives the source reference signal (e.g., SSB, PRS, TRS), the UE can report an LUT and the identifier of the source reference signal (e.g., SSB ID, PRS ID, TRS ID) with which the reported LUT is associated. Because the location server has configured the source reference signal for the two PRS resources (i.e., PRS ID2 and PRS ID3), whenever it receives the LUT for the source reference signal, it knows that the LUT applies to the two PRS resources.

Similarly, where each SRS resource allocated to the UE is provided with SRS spatial relation information, an LUT may not be associated with an SRS resource ID, but rather, with the downlink reference signal used as the spatial relation reference downlink reference signal for the SRS resource. That is, an LUT for an SRS resource may be associated with the reference downlink reference signal that is the source of the spatial relation between the downlink receive beam (on which the reference downlink reference signal is received) and the uplink transmit beam (on which the SRS resource is transmitted).

Figure 8B:
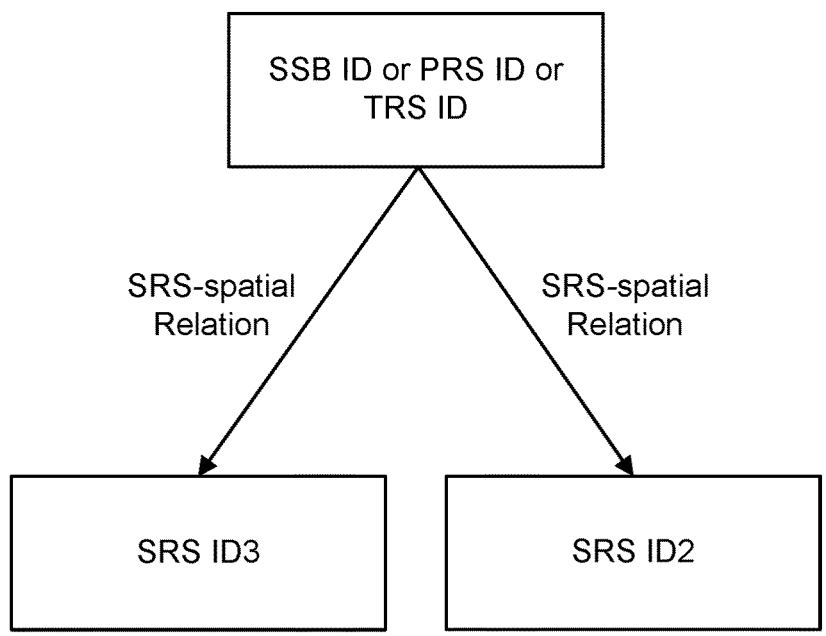
FIG. 8B illustrates two uplink reference signal resources having the same spatial relation reference downlink reference signal, according to aspects of the disclosure.

For example, as illustrated in FIG. 8B, if two SRS resources (labeled "SRS ID2" and "SRS ID3" in FIG. 8B) have the same spatial relation reference downlink reference signal, such as the same SSB, PRS, or TRS, then there is no need for the UE to send the two LUTs for the two SRS resources to the location server. Rather, since the UE is expected to transmit the two SRS resources (i.e., SRS ID2 and SRS ID3) with the beam derived from the spatial relation reference downlink reference signal (e.g., SSB, PRS, TRS), the UE can report an LUT and the identifier of the reference downlink reference signal (e.g., SSB ID, PRS ID, TRS ID) with which the reported LUT is associated. Because the location server has configured the reference downlink reference signal for the two SRS resources (i.e., SRS ID2 and SRS ID3), whenever it receives the LUT for the reference downlink reference signal, it knows that the LUT applies to the two SRS resources.

In an aspect, the UE may send, via the location server, the beam-specific group delay-per-frequency LUTs to the base stations participating in the multi-RTT procedure (both serving and neighboring), and the base stations may apply this information to the SRS reception, before forwarding the base station Tx-Rx parameters (e.g., $T_{Tx \rightarrow Rx}$ 622 in FIG. 6A) to the location server for positioning estimation. More specifically, while the location server calculates the position estimate, it does so based on measurements from the base station (e.g., the base station Tx-Rx parameter $T_{Tx \rightarrow Rx}$ 622 in FIG. 6A). A base station receives the uplink SRS from the UE and processes it to obtain the base station Tx-Rx parameter. If the base station has knowledge of the LUT from the UE, it can apply this knowledge to adjust the received SRS waveform before deriving the base station Tx-Rx parameter. In an aspect, the UE can report the LUT(s) to the location server using LPP, and the location server would send the LUT(s) to the base stations via LTE positioning protocol A (LPPa) or NR positioning protocol A (NRPPa).

In the case of UE-based positioning, a base station may forward a beam-specific group delay-per-frequency LUT to the UE (e.g., through the location server or serving base station), and the UE may apply this information to derive the UE Tx-Rx parameter before performing the positioning estimation.

Figure 9:
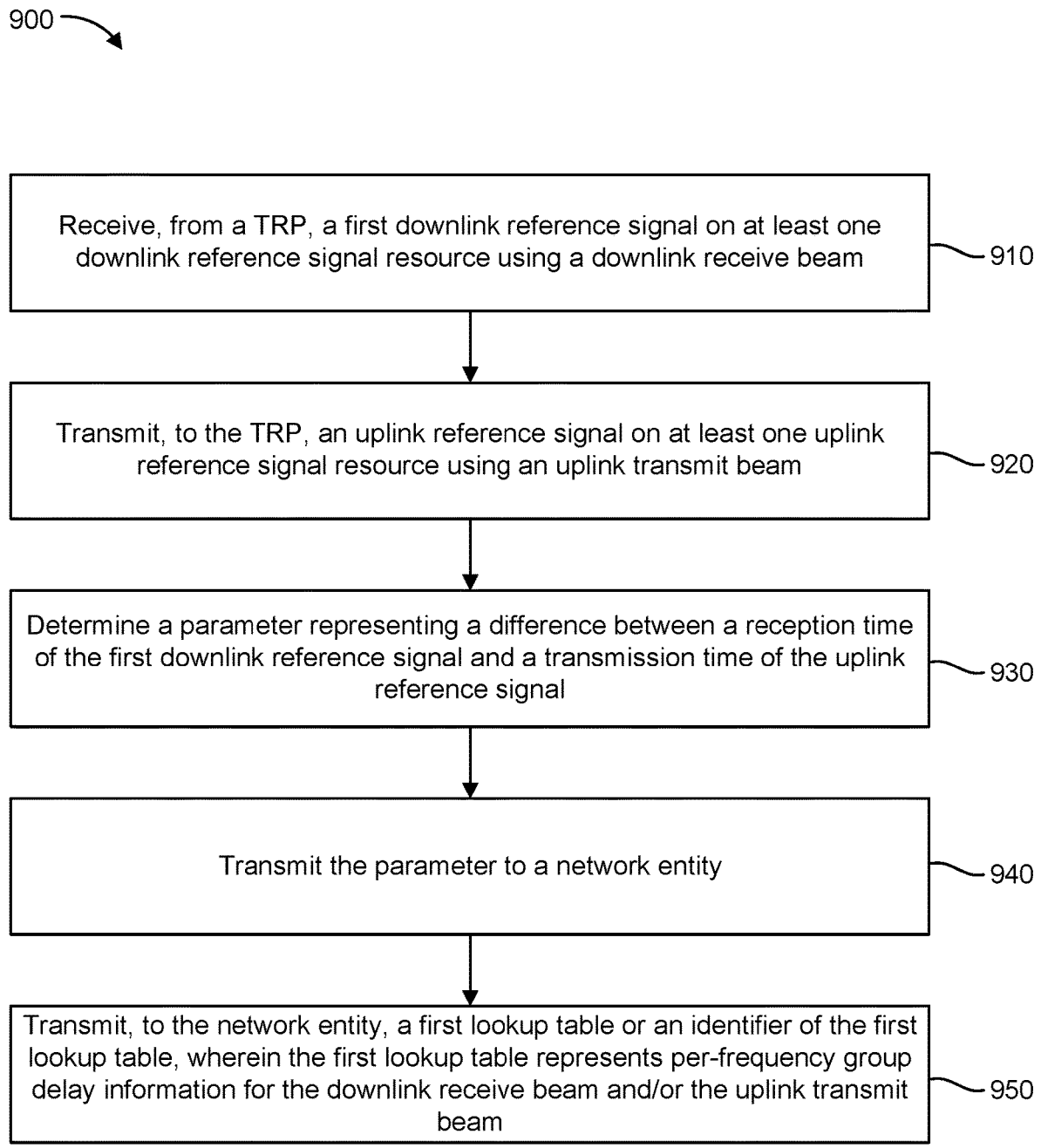
FIGS. 9 and 10 illustrate methods of wireless communication, according to aspects of the disclosure.

FIG. 9 illustrates an exemplary method 900 for wireless communication, according to aspects of the disclosure. The method 900 may be performed by a UE (e.g., any of the UEs described herein).

At 910, the UE receives, from a TRP, a first downlink reference signal on at least one downlink reference signal resource using a downlink receive beam. In an aspect, operation 910 may be performed by the WWAN transceiver 310, the receiver(s) 312, the processing system 332, the memory component 340, and/or the LUT manager 342, and or all of which may be considered means for performing this operation.

At 920, the UE transmits, to the TRP, an uplink reference signal on at least one uplink reference signal resource using an uplink transmit beam. In an aspect, operation 920 may be performed by the WWAN transceiver 310, the transmitter(s) 314, the processing system 332, the memory component 340, and/or the LUT manager 342, and or all of which may be considered means for performing this operation.

At 930, the UE determines a parameter representing a difference between a reception time of the first downlink reference signal and a transmission time of the uplink reference signal (e.g., the UE Rx-Tx parameter). In an aspect, operation 930 may be performed by the WWAN transceiver 310, the processing system 332, the memory component 340, and/or the LUT manager 342, and or all of which may be considered means for performing this operation.

At 940, the UE transmits the parameter to a network entity (e.g., the TRP, location server 230, LMF 270). In an aspect, operation 940 may be performed by the WWAN transceiver 310, the transmitter(s) 314, the processing system 332, the memory component 340, and/or the LUT manager 342, and or all of which may be considered means for performing this operation.

At 950, the UE transmits, to the network entity, a first lookup table or an identifier of the first lookup table, wherein the first lookup table represents per-frequency group delay information for the downlink receive beam and/or the uplink transmit beam. In an aspect, operation 950 may be performed by the WWAN transceiver 310, the transmitter(s) 314, the processing system 332, the memory component 340, and/or the LUT manager 342, and or all of which may be considered means for performing this operation.

Figure 10:
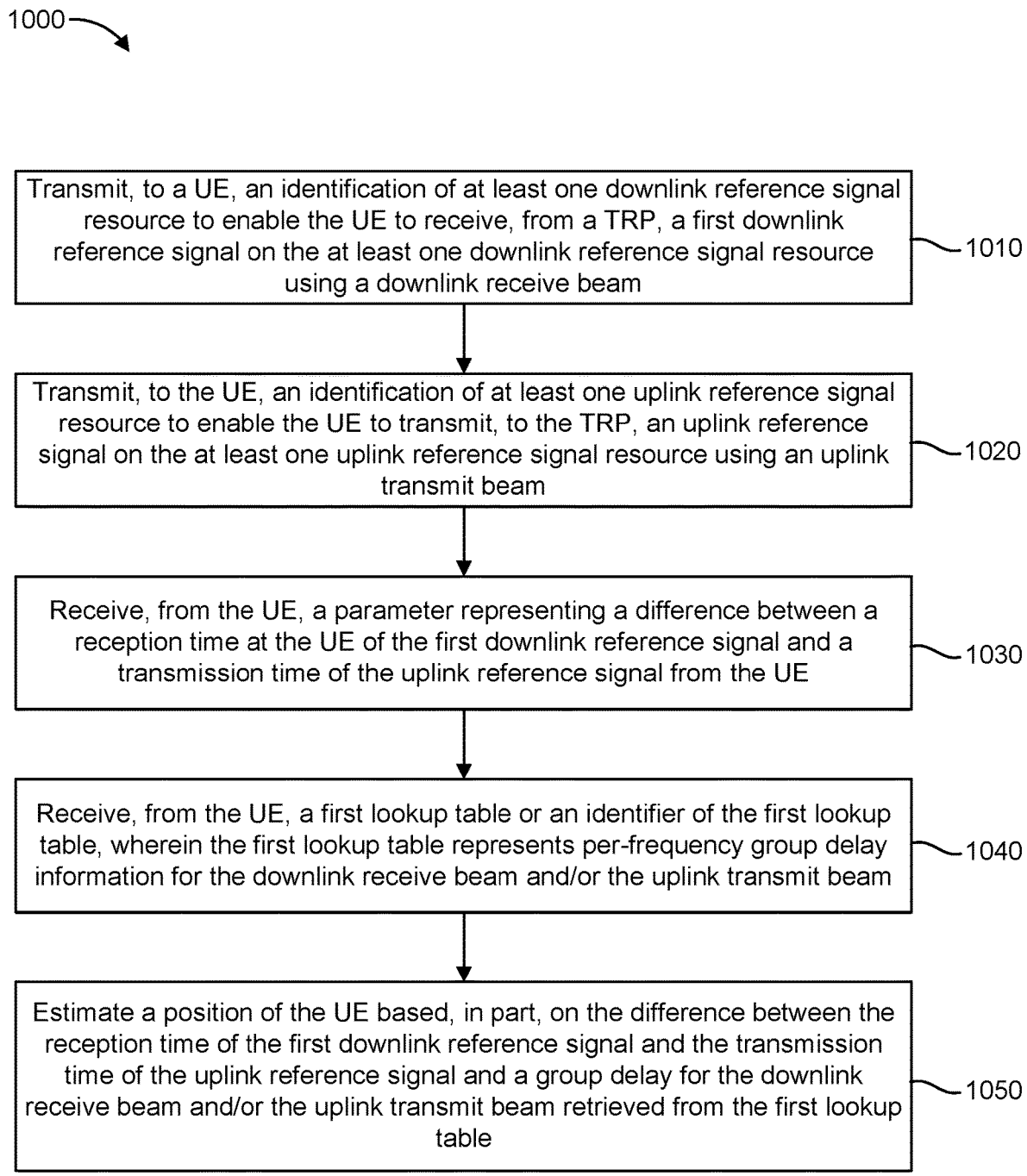

FIG. 10 illustrates an exemplary method 1000 for wireless communication, according to aspects of the disclosure. The method 1000 may be performed by a network entity (e.g., a serving TRP, location server 230, LMF 270).

At 1010, the network entity transmits, to a UE (e.g., any of the UEs described herein), an identification of at least one downlink reference signal resource to enable the UE to receive, from a TRP (e.g., a TRP of any of the base stations described herein), a first downlink reference signal on the at least one downlink reference signal resource using a downlink receive beam. In an aspect, where the network entity is a location server, operation 1010 may be performed by the network interface(s) 390, the processing system 394, the memory component 396, and/or the LUT manager 398, and or all of which may be considered means for performing this operation. Where the network entity is a TRP, operation 1010 may be performed by the WWAN transceiver 350, the processing system 384, the memory 386, and/or the LUT manager 388, any or all of which may be considered means for performing this operation.

At 1020, the network entity transmits, to the UE, an identification of at least one uplink reference signal resource to enable the UE to transmit, to the TRP, an uplink reference signal on the at least one uplink reference signal resource using an uplink transmit beam. In an aspect, where the network entity is a location server, operation 1020 may be performed by the network interface(s) 390, the processing system 394, the memory component 396, and/or the LUT manager 398, and or all of which may be considered means for performing this operation. Where the network entity is a TRP, operation 1020 may be performed by the WWAN transceiver 350, the processing system 384, the memory 386, and/or the LUT manager 388, any or all of which may be considered means for performing this operation.

At 1030, the network entity receives, from the UE, a parameter representing a difference between a reception time at the UE of the first downlink reference signal and a transmission time of the uplink reference signal from the UE. In an aspect, where the network entity is a location server, operation 1030 may be performed by the network interface(s) 390, the processing system 394, the memory component 396, and/or the LUT manager 398, and or all of which may be considered means for performing this operation. Where the network entity is a TRP, operation 1030 may be performed by the WWAN transceiver 350, the processing system 384, the memory 386, and/or the LUT manager 388, any or all of which may be considered means for performing this operation.

At 1040, the network entity receives, from the UE, a first lookup table or an identifier of the first lookup table, wherein the first lookup table represents per-frequency group delay information for the downlink receive beam and/or the uplink transmit beam. In an aspect, where the network entity is a location server, operation 1040 may be performed by the network interface(s) 390, the processing system 394, the memory component 396, and/or the LUT manager 398, and or all of which may be considered means for performing this operation. Where the network entity is a TRP, operation 1040 may be performed by the WWAN transceiver 350, the processing system 384, the memory 386, and/or the LUT manager 388, any or all of which may be considered means for performing this operation.

At 1050, the network entity estimates a position of the UE based, in part, on the difference between the reception time of the first downlink reference signal and the transmission time of the uplink reference signal and a group delay for the downlink receive beam and/or the uplink transmit beam retrieved from the first lookup table. The network entity may also base the position estimate based on a base station Tx-Rx parameter and any group delay(s) received from the TRP. In an aspect, where the network entity is a location server, operation 1050 may be performed by the network interface(s) 390, the processing system 394, the memory component 396, and/or the LUT manager 398, and or all of which may be considered means for performing this operation. Where the network entity is a TRP, operation 1050 may be performed by the WWAN transceiver 350, the processing system 384, the memory 386, and/or the LUT manager 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
at least one transceiver; and
at least one processor communicatively coupled to the memory and the at least one transceiver, the at least one processor configured to:
receive, from a transmission-reception point (TRP) via the at least one transceiver, a first downlink reference signal on at least one downlink reference signal resource using a downlink receive beam;
cause the at least one transceiver to transmit, to the TRP, an uplink reference signal on at least one uplink reference signal resource using an uplink transmit beam;
determine a parameter representing a difference between a reception time of the first downlink reference signal and a transmission time of the uplink reference signal;
cause the at least one transceiver to transmit the parameter to a network entity; and
cause the at least one transceiver to transmit, to the network entity, a first lookup table or an identifier of the first lookup table, wherein the first lookup table represents per-frequency group delay information for the downlink receive beam and/or the uplink transmit beam.

2. The UE of claim 1, wherein the at least one processor is further configured to:
cause the at least one transceiver to transmit, to the network entity, an identifier associated with the downlink receive beam.

3. The UE of claim 2, wherein the identifier associated with the downlink receive beam is an identifier of the first downlink reference signal.

4. The UE of claim 2, wherein the identifier associated with the downlink receive beam is an identifier of the at least one downlink reference signal resource.

5. The UE of claim 1, wherein the at least one processor is further configured to:
cause the at least one transceiver to transmit, to the network entity, a second lookup table or an identifier of the second lookup table, wherein the second lookup table represents per-frequency group delay information for the uplink transmit beam, and wherein the first lookup table represents the per-frequency group delay information for the downlink receive beam.

6. The UE of claim 5, wherein the at least one processor is further configured to:
cause the at least one transceiver to transmit, to the network entity, an identifier associated with the downlink receive beam; and/or
cause the at least one transceiver to transmit, to the network entity, an identifier associated with the uplink transmit beam.

7. The UE of claim 6, wherein:
the identifier associated with the downlink receive beam is an identifier of the first downlink reference signal, and/or
the identifier associated with the uplink transmit beam is an identifier of the uplink reference signal.

8. The UE of claim 6, wherein:
the identifier associated with the downlink receive beam is an identifier of the at least one downlink reference signal resource, and/or the identifier associated with the uplink transmit beam is an identifier of the at least one uplink reference signal resource.

9. The UE of claim 8, wherein:
the first downlink reference signal is a positioning reference signal (PRS),
the uplink reference signal is a sounding reference signal (SRS),
the identifier of the at least one downlink reference signal resource is an identifier of a PRS resource or a PRS resource set on which the PRS is transmitted, and
the identifier of the at least one uplink reference signal resource is an identifier of an SRS resource or an SRS resource set on which the SRS is transmitted.

10. The UE of claim 8, wherein the at least one processor being configured to cause the at least one transceiver to transmit the second lookup table comprises the at least one processor being configured to cause the at least one transceiver to transmit only differences between the first lookup table and the second lookup table.

11. The UE of claim 6, wherein:
the identifier associated with the downlink receive beam is an identifier of the downlink receive beam, and
the identifier associated with the uplink transmit beam is an identifier of the uplink transmit beam.

12. The UE of claim 6, wherein the at least one processor is further configured to:
receive, from the TRP or a second TRP via the at least one transceiver, a second downlink reference signal on the downlink receive beam associated with the reception of the first downlink reference signal.

13. The UE of claim 12, wherein:
the second downlink reference signal is a quasi-collocation source reference signal for the first downlink reference signal, and
the identifier associated with the downlink receive beam is an identifier of the second downlink reference signal.

14. The UE of claim 12, wherein:
the second downlink reference signal is a spatial relation reference downlink reference signal for the uplink reference signal, and
the identifier associated with the uplink transmit beam is an identifier of the second downlink reference signal.

15. The UE of claim 12, wherein the second downlink reference signal is a synchronization signal block (SSB), a channel state information reference signal (CSI-RS), a tracking reference signal (TRS), or a PRS.

16. The UE of claim 5, wherein the at least one processor causes the at least one transceiver to transmit the first lookup table or the identifier of the first lookup table before or simultaneously with transmission of the second lookup table or the identifier of the second lookup table to indicate that the first lookup table represents the per-frequency group delay information for the downlink receive beam and the second lookup table represents the per-frequency group delay information for the uplink transmit beam.

17. The UE of claim 5, wherein the at least one processor causes the at least one transceiver to transmit the second lookup table or the identifier of the second lookup table before or simultaneously with transmission of the first lookup table or the identifier of the first lookup table to indicate that the first lookup table represents the per-frequency group delay information for the downlink receive beam and the second lookup table represents the per-frequency group delay information for the uplink transmit beam.

18. The UE of claim 1, wherein the first lookup table represents the per-frequency group delay information for the downlink receive beam and the uplink transmit beam.

19. The UE of claim 1, wherein the at least one processor is further configured to:
cause the at least one transceiver to transmit the first lookup table to the network entity before reception of the first downlink reference signal from the TRP.

20. The UE of claim 19, wherein the per-frequency group delay information represented by the first lookup table comprise ranges of average group delay, group delay spread, or both for the downlink receive beam and/or the uplink transmit beam.

21. The UE of claim 19, wherein the at least one processor causes the at least one transceiver to transmit the identifier of the first lookup table to the network entity after reception of the first downlink reference signal from the TRP.

22. The UE of claim 21, wherein the first lookup table has not changed between transmission of the first lookup table and transmission of the identifier of the first lookup table.

23. The UE of claim 1, wherein the at least one processor is further configured to:
receive, via the at least one transceiver, a trigger from the network entity to transmit the first lookup table.

24. The UE of claim 1, wherein the first lookup table represents a plurality of frequency bins for a carrier frequency on which the first downlink reference signal is transmitted, wherein each frequency bin is associated with a group delay for the downlink receive beam when formed at a frequency within the frequency bin.

25. The UE of claim 1, wherein the network entity is the TRP or a location server.

26. A network entity, comprising:
a memory;
at least one network interface; and
at least one processor communicatively coupled to the memory and the network interface, the at least one processor configured to:
cause the at least one network interface to transmit, to a user equipment (UE), an identification of at least one downlink reference signal resource to enable the UE to receive, from a transmission-reception point (TRP), a first downlink reference signal on the at least one downlink reference signal resource using a downlink receive beam;
cause the at least one network interface to transmit, to the UE, an identification of at least one uplink reference signal resource to enable the UE to transmit, to the TRP, an uplink reference signal on the at least one uplink reference signal resource using an uplink transmit beam;
receive, from the UE via the at least one network interface, a parameter representing a difference between a reception time at the UE of the first downlink reference signal and a transmission time of the uplink reference signal from the UE;
receive, from the UE via the at least one network interface, a first lookup table or an identifier of the first lookup table, wherein the first lookup table represents per-frequency group delay information for the downlink receive beam and/or the uplink transmit beam; and
estimate a position of the UE based, in part, on the difference between the reception time of the first downlink reference signal and the transmission time of the uplink reference signal and a group delay for the downlink receive beam and/or the uplink transmit beam retrieved from the first lookup table.

27. The network entity of claim 26, wherein the at least one processor is further configured to:
receive, from the UE via the at least one network interface, an identifier associated with the downlink receive beam.

28. The network entity of claim 27, wherein the identifier associated with the downlink receive beam is an identifier of the first downlink reference signal.

29. The network entity of claim 27, wherein the identifier associated with the downlink receive beam is an identifier of the at least one downlink reference signal resource.

30. The network entity of claim 26, wherein the at least one processor is further configured to:
receive, from the UE via the at least one network interface, a second lookup table or an identifier of the second lookup table, wherein the second lookup table represents per-frequency group delay information for the uplink transmit beam, and wherein the first lookup table represents the per-frequency group delay information for the downlink receive beam.

31. The network entity of claim 30, wherein the at least one processor is further configured to:
receive, from the UE via the at least one network interface, an identifier associated with the downlink receive beam; and
receive, from the UE via the at least one network interface, an identifier associated with the uplink transmit beam.

32. The network entity of claim 31, wherein:
the identifier associated with the downlink receive beam is an identifier of the first downlink reference signal, and
the identifier associated with the uplink transmit beam is an identifier of the uplink reference signal.

33. The network entity of claim 31, wherein:
the identifier associated with the downlink receive beam is an identifier of the at least one downlink reference signal resource, and
the identifier associated with the uplink transmit beam is an identifier of the at least one uplink reference signal resource.

34. The network entity of claim 33, wherein:
the first downlink reference signal is a positioning reference signal (PRS),
the uplink reference signal is a sounding reference signal (SRS),
the identifier of the at least one downlink reference signal resource is an identifier of a PRS resource or a PRS resource set on which the PRS is transmitted, and
the identifier of the at least one uplink reference signal resource is an identifier of an SRS resource or an SRS resource set on which the SRS is transmitted.

35. The network entity of claim 31, wherein:
the identifier associated with the downlink receive beam is an identifier of the downlink receive beam, and
the identifier associated with the uplink transmit beam is an identifier of the uplink transmit beam.

36. The network entity of claim 31, wherein the at least one processor is further configured to:
cause the at least one network interface to transmit, to the UE, an identification of a second at least one downlink reference signal resource to enable the UE to receive, before reception of the first downlink reference signal, a second downlink reference signal on the second at least one downlink reference signal resource using the downlink receive beam.

37. The network entity of claim 36, wherein:
the second downlink reference signal is a quasi-collocation source reference signal for the first downlink reference signal, and
the identifier associated with the downlink receive beam is an identifier of the second downlink reference signal.

38. The network entity of claim 36, wherein:
the second downlink reference signal is a spatial relation reference downlink reference signal for the uplink reference signal, and
the identifier associated with the uplink transmit beam is an identifier of the second downlink reference signal.

39. The network entity of claim 36, wherein the second downlink reference signal is a synchronization signal block (SSB), a channel state information reference signal (CSI-RS), a tracking reference signal (TRS), or a PRS.

40. The network entity of claim 36, wherein the at least one downlink reference signal resource is the same as the second at least one downlink reference signal resource.

41. The network entity of claim 30, wherein reception of the first lookup table or the identifier of the first lookup table before or simultaneously with reception of the second lookup table or the identifier of the second lookup table indicates that the first lookup table represents the per-frequency group delay information for the downlink receive beam and the second lookup table represents the per-frequency group delay information for the uplink transmit beam.

42. The network entity of claim 30, wherein reception of the second lookup table or the identifier of the second lookup table before or simultaneously with reception of the first lookup table or the identifier of the first lookup table indicates that the first lookup table represents the per-frequency group delay information for the downlink receive beam and the second lookup table represents the per-frequency group delay information for the uplink transmit beam.

43. The network entity of claim 30 wherein the second lookup table comprises only differences between the first lookup table and the second lookup table.

44. The network entity of claim 26, wherein the first lookup table represents the per-frequency group delay information for the downlink receive beam and the uplink transmit beam.

45. The network entity of claim 26, wherein the first lookup table is received before transmission to the UE of the identification of the at least one downlink reference signal resource.

46. The network entity of claim 45, wherein the per-frequency group delay information represented by the first lookup table comprise ranges of average group delay, group delay spread, or both for the downlink receive beam and/or the uplink transmit beam.

47. The network entity of claim 45, wherein the identifier of the first lookup table is received after transmission to the UE of the identification of the at least one downlink reference signal resource.

48. The network entity of claim 47, wherein the first lookup table has not changed between reception of the first lookup table and reception of the identifier of the first lookup table.

49. The network entity of claim 26, wherein the at least one processor is further configured to:

cause the at least one network interface to transmit a trigger to the UE to transmit the first lookup table.

50. The network entity of claim 26, wherein the first lookup table represents a plurality of frequency bins for a carrier frequency on which the first downlink reference signal is transmitted, wherein each frequency bin is associated with a group delay for the downlink receive beam when formed at a frequency within the frequency bin.

51. The network entity of claim 26, wherein the network entity is the TRP or a location server.

52. A method of wireless communication performed by a user equipment (UE), comprising:
   receiving, from a transmission-reception point (TRP), a first downlink reference signal on at least one downlink reference signal resource using a downlink receive beam;
   transmitting, to the TRP, an uplink reference signal on at least one uplink reference signal resource using an uplink transmit beam;
   determining a parameter representing a difference between a reception time of the first downlink reference signal and a transmission time of the uplink reference signal;
   transmitting the parameter to a network entity; and
   transmitting, to the network entity, a first lookup table or an identifier of the first lookup table, wherein the first lookup table represents per-frequency group delay information for the downlink receive beam and/or the uplink transmit beam.

53. The method of claim 52, further comprising:
   transmitting, to the network entity, an identifier associated with the downlink receive beam.

54. The method of claim 52, further comprising:
   transmitting, to the network entity, a second lookup table or an identifier of the second lookup table, wherein the second lookup table represents per-frequency group delay information for the uplink transmit beam, and wherein the first lookup table represents the per-frequency group delay information for the downlink receive beam.

55. The method of claim 54, further comprising:
   transmitting, to the network entity, an identifier associated with the downlink receive beam; and/or
   transmitting, to the network entity, an identifier associated with the uplink transmit beam.

56. The method of claim 55, further comprising:
   receiving, from the TRP or a second TRP, a second downlink reference signal on the downlink receive beam associated with the reception of the first downlink reference signal.

57. The method of claim 54, wherein the UE transmits the first lookup table or the identifier of the first lookup table before or simultaneously with transmission of the second lookup table or the identifier of the second lookup table to indicate that the first lookup table represents the per-frequency group delay information for the downlink receive beam and the second lookup table represents the per-frequency group delay information for the uplink transmit beam.

58. The method of claim 54, wherein the UE transmits the second lookup table or the identifier of the second lookup table before or simultaneously with transmission of the first lookup table or the identifier of the first lookup table to indicate that the first lookup table represents the per-frequency group delay information for the downlink receive beam and the second lookup table represents the per-frequency group delay information for the uplink transmit beam.

59. The method of claim 52, wherein the first lookup table represents the per-frequency group delay information for the downlink receive beam and the uplink transmit beam.

60. The method of claim 52, further comprising:
   transmitting the first lookup table to the network entity before reception of the first downlink reference signal from the TRP.

61. The method of claim 52, wherein the first lookup table represents a plurality of frequency bins for a carrier frequency on which the first downlink reference signal is transmitted, wherein each frequency bin is associated with a group delay for the downlink receive beam when formed at a frequency within the frequency bin.

62. The method of claim 52, wherein the network entity is the TRP or a location server.

63. A method of wireless communication performed by a network entity, comprising:
   transmitting, to a user equipment (UE), an identification of at least one downlink reference signal resource to enable the UE to receive, from a transmission-reception point (TRP), a first downlink reference signal on the at least one downlink reference signal resource using a downlink receive beam;
   transmitting, to the UE, an identification of at least one uplink reference signal resource to enable the UE to transmit, to the TRP, an uplink reference signal on the at least one uplink reference signal resource using an uplink transmit beam;
   receiving, from the UE, a parameter representing a difference between a reception time at the UE of the first downlink reference signal and a transmission time of the uplink reference signal from the UE;
   receiving, from the UE, a first lookup table or an identifier of the first lookup table, wherein the first lookup table represents per-frequency group delay information for the downlink receive beam and/or the uplink transmit beam; and
   estimating a position of the UE based, in part, on the difference between the reception time of the first downlink reference signal and the transmission time of the uplink reference signal and a group delay for the downlink receive beam and/or the uplink transmit beam retrieved from the first lookup table.

64. The method of claim 63, further comprising:
   receiving, from the UE, an identifier associated with the downlink receive beam.

65. The method of claim 63, further comprising:
   receiving, from the UE, a second lookup table or an identifier of the second lookup table, wherein the second lookup table represents per-frequency group delay information for the uplink transmit beam, and wherein the first lookup table represents the per-frequency group delay information for the downlink receive beam.

66. The method of claim 65, further comprising:
   receiving, from the UE, an identifier associated with the downlink receive beam; and
   receiving, from the UE, an identifier associated with the uplink transmit beam.

67. The method of claim 66, further comprising:
   transmitting, to the UE, an identification of a second at least one downlink reference signal resource to enable the UE to receive, before reception of the first downlink reference signal, a second downlink reference signal on the second at least one downlink reference signal resource using the downlink receive beam.

68. The method of claim 67, wherein:
the second downlink reference signal is a quasi-collocation source reference signal for the first downlink reference signal, and
the identifier associated with the downlink receive beam is an identifier of the second downlink reference signal.

69. The method of claim 67, wherein:
the second downlink reference signal is a spatial relation reference downlink reference signal for the uplink reference signal, and
the identifier associated with the uplink transmit beam is an identifier of the second downlink reference signal.

70. The method of claim 65 wherein the second lookup table comprises only differences between the first lookup table and the second lookup table.

71. The method of claim 63, wherein the first lookup table is received before transmission to the UE of the identification of the at least one downlink reference signal resource.

72. The method of claim 63, wherein the network entity is the TRP or a location server.

73. A user equipment (UE), comprising:
means for receiving, from a transmission-reception point (TRP), a first downlink reference signal on at least one downlink reference signal resource using a downlink receive beam;
means for transmitting, to the TRP, an uplink reference signal on at least one uplink reference signal resource using an uplink transmit beam;
means for determining a parameter representing a difference between a reception time of the first downlink reference signal and a transmission time of the uplink reference signal;
means for transmitting the parameter to a positioning entity; and
means for transmitting, to the positioning entity, a first lookup table or an identifier of the first lookup table, wherein the first lookup table represents per-frequency group delay information for the downlink receive beam and/or the uplink transmit beam.

74. A network entity, comprising:
means for transmitting, to a user equipment (UE), an identification of at least one downlink reference signal resource to enable the UE to receive, from a transmission-reception point (TRP), a first downlink reference signal on the at least one downlink reference signal resource using a downlink receive beam;
means for transmitting, to the UE, an identification of at least one uplink reference signal resource to enable the UE to transmit, to the TRP, an uplink reference signal on the at least one uplink reference signal resource using an uplink transmit beam;
means for receiving, from the UE, a parameter representing a difference between a reception time at the UE of the first downlink reference signal and a transmission time of the uplink reference signal from the UE;
means for receiving, from the UE, a first lookup table or an identifier of the first lookup table, wherein the first lookup table represents per-frequency group delay information for the downlink receive beam and/or the uplink transmit beam; and
means for estimating a position of the UE based, in part, on the difference between the reception time of the first downlink reference signal and the transmission time of the uplink reference signal and a group delay for the downlink receive beam and/or the uplink transmit beam retrieved from the first lookup table.

75. A non-transitory computer-readable medium storing computer-executable instructions that, when executed by a user equipment (UE), cause the UE to:
receive, from a transmission-reception point (TRP), a first downlink reference signal on at least one downlink reference signal resource using a downlink receive beam;
transmit, to the TRP, an uplink reference signal on at least one uplink reference signal resource using an uplink transmit beam;
determine a parameter representing a difference between a reception time of the first downlink reference signal and a transmission time of the uplink reference signal;
transmit the parameter to a positioning entity; and
transmit, to the positioning entity, a first lookup table or an identifier of the first lookup table, wherein the first lookup table represents per-frequency group delay information for the downlink receive beam and/or the uplink transmit beam.

76. A non-transitory computer-readable medium storing computer-executable instructions that, when executed by a network entity, cause the network entity to:
transmit, to a user equipment (UE), an identification of at least one downlink reference signal resource to enable the UE to receive, from a transmission-reception point (TRP), a first downlink reference signal on the at least one downlink reference signal resource using a downlink receive beam;
transmit, to the UE, an identification of at least one uplink reference signal resource to enable the UE to transmit, to the TRP, an uplink reference signal on the at least one uplink reference signal resource using an uplink transmit beam;
receive, from the UE, a parameter representing a difference between a reception time at the UE of the first downlink reference signal and a transmission time of the uplink reference signal from the UE;
receive, from the UE, a first lookup table or an identifier of the first lookup table, wherein the first lookup table represents per-frequency group delay information for the downlink receive beam and/or the uplink transmit beam; and
estimate a position of the UE based, in part, on the difference between the reception time of the first downlink reference signal and the transmission time of the uplink reference signal and a group delay for the downlink receive beam and/or the uplink transmit beam retrieved from the first lookup table.

* * * * *